United States Patent
You et al.

(10) Patent No.: US 12,229,647 B2
(45) Date of Patent: Feb. 18, 2025

(54) UNIFIED PARKED DOMAIN DETECTION SYSTEM

(71) Applicant: Palo Alto Networks, Inc., Santa Clara, CA (US)

(72) Inventors: Zeyu You, Santa Clara, CA (US); Wei Wang, Milpitas, CA (US); Yu Zhang, Newark, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 236 days.

(21) Appl. No.: 17/877,205

(22) Filed: Jul. 29, 2022

(65) Prior Publication Data

US 2024/0037443 A1 Feb. 1, 2024

(51) Int. Cl.
| | | |
|---|---|---|
| G06N 20/00 | (2019.01) | |
| G06F 16/953 | (2019.01) | |
| G06F 16/955 | (2019.01) | |
| G06F 16/958 | (2019.01) | |
| G06F 21/57 | (2013.01) | |
| H04L 9/40 | (2022.01) | |

(52) U.S. Cl.
CPC .......... *G06N 20/00* (2019.01); *G06F 16/953* (2019.01); *G06F 16/9558* (2019.01); *G06F 16/958* (2019.01); *G06F 21/57* (2013.01); *H04L 63/14* (2013.01); *G06F 2221/2119* (2013.01)

(58) Field of Classification Search
None
See application file for complete search history.

(56) References Cited

U.S. PATENT DOCUMENTS

| | | | |
|---|---|---|---|
| 7,756,987 B2 | 7/2010 | Wang | |
| 9,075,886 B2 | 7/2015 | Simpson | |
| 9,807,110 B2 | 10/2017 | Harlacher | |
| 10,574,681 B2 | 2/2020 | Meshi | |
| 10,681,071 B1* | 6/2020 | Pendergast | H04L 63/1458 |
| 11,373,106 B2* | 6/2022 | Chavan | G06V 30/416 |
| 2009/0307360 A1 | 12/2009 | Ianchici | |
| 2015/0264070 A1* | 9/2015 | Harlacher | H04L 63/1408 726/23 |
| 2020/0059451 A1* | 2/2020 | Huang | G06N 3/044 |
| 2021/0117825 A1* | 4/2021 | Dickey | G06F 16/9535 |
| 2023/0006956 A1* | 1/2023 | Hamilton | H04L 51/212 |
| 2023/0118679 A1* | 4/2023 | Mayer | H04L 63/1433 707/706 |
| 2023/0252173 A1* | 8/2023 | Amonkar | H04L 9/0825 713/189 |
| 2023/0289587 A1* | 9/2023 | Shen | G06Q 90/00 |

OTHER PUBLICATIONS

Vissers et al. Parking Sensors: Analyzing and Detecting Parked Domains. NDSS '15, Feb. 8-11, 2015, San Diego, CA, USA. Copyright 2015 Internet Society, ISBN 1-891562-38-X. http://dx.doi.org/10.14722/ndss.2015.23053.

* cited by examiner

*Primary Examiner* — Kaveh Abrishamkar
(74) *Attorney, Agent, or Firm* — Van Pelt, Yi & James LLP

(57) ABSTRACT

The present application discloses a method, system, and computer system for detecting parked domains. The method includes obtaining, by one or more processors, a set of webpages corresponding to a plurality of domains, extracting a plurality of features based on the set of webpages, detecting parked domains based on the plurality of features using a machine learning model, and periodically applying automatic signature generation to detect a new pattern of parked domains without retraining the machine learning model.

23 Claims, 14 Drawing Sheets

UNIFIED PARKED DOMAIN DETECTION SYSTEM

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. As another example, such individuals may input command strings such as SQL input strings, etc., that cause a remote host to execute such command strings. As another example, such individuals develop webpages that host malware or other malicious content. The malware or other malicious content can turn a compromised computer into a "bot" in a "botnet," receiving instructions from and/or reporting data to a command and control (C&C) server under the control of the nefarious individual. One approach to mitigating the damage caused by exploit tools (e.g., malware, malicious command strings, etc.) is for a security company (or other appropriate entity) to attempt to identify exploit tools and prevent it from reaching/executing on end user computers. Another approach is to try to prevent compromised computers from communicating with the C&C server. Unfortunately, malicious authors are using increasingly sophisticated techniques to obfuscate the workings of their exploit tools. Accordingly, there exists an ongoing need for improved techniques to detect malware or exploits and prevent their harm.

BRIEF DESCRIPTION OF THE DRAWINGS

Various embodiments of the invention are disclosed in the following detailed description and the accompanying drawings.

DETAILED DESCRIPTION

Figure 1:
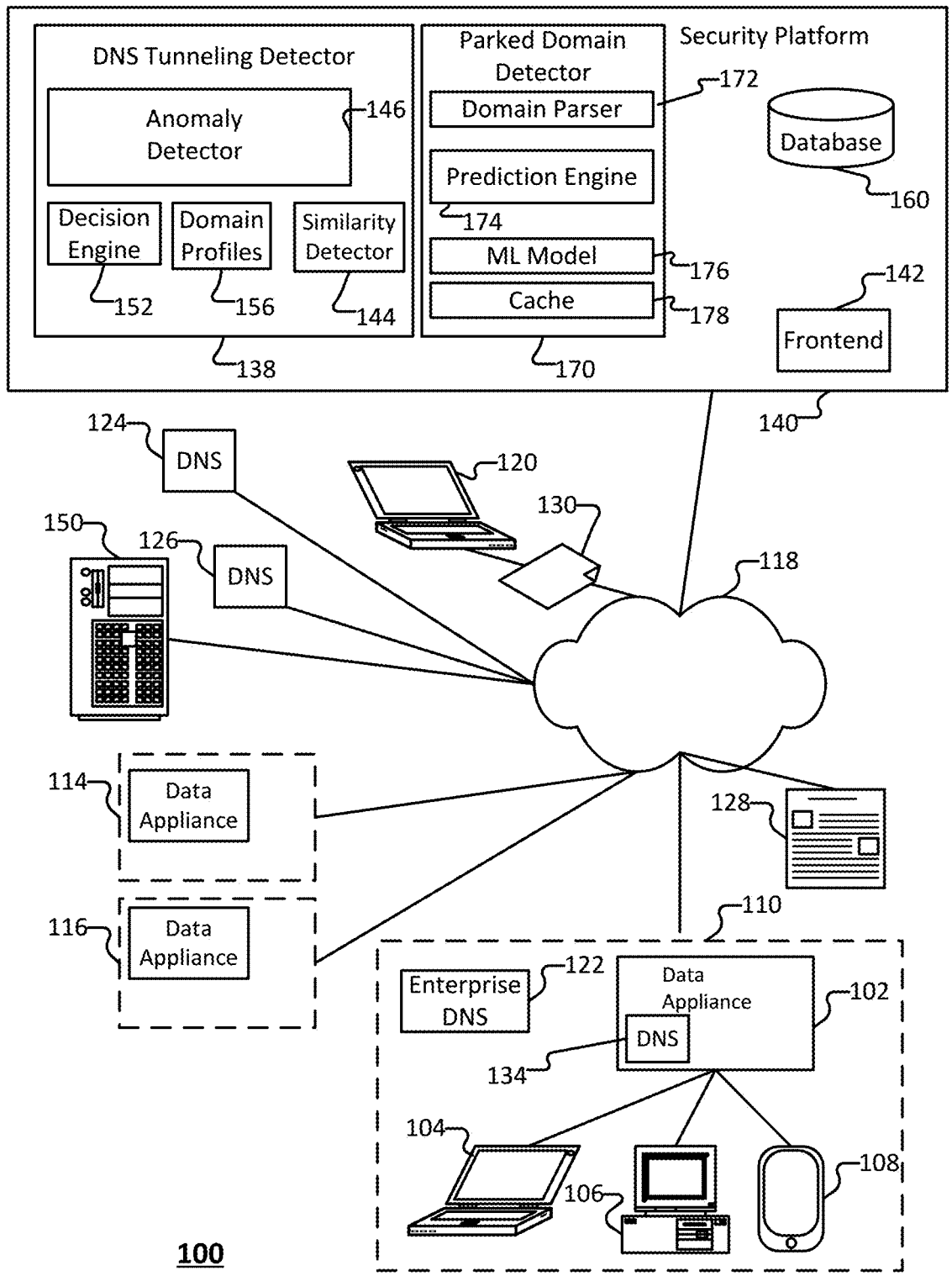
FIG. 1 is a block diagram of an environment in which a parked domain is detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a parked domain may include a domain that is registered but that is not connected to an online service such as a legitimate commercial website or email hosting. A parked domain generally has a landing page with various text and links. An example of a parked domain is a view (e.g., a webpage) that reserves and protects cybersquatting. Parked domains are commonly owned or controlled by the registrar or reseller.

As used herein, a zero-day exploit may include an exploit that is not known yet such as the exploit is not within the public domain.

As used herein, regex (also referred to as a regular expression) may include a pattern or a sequence of characters. For example, the sequence of characters specifies a search pattern in text.

As used herein, a feature is a measurable property or characteristic manifested in input data, which may be raw data. As an example, a feature may be a set of one or more relationships manifested in the input data. As another example, a feature may be a set of one or more relationships between maliciousness of a file (e.g., an indication of whether the file is malicious) and an attribute or information pertaining to the file, such as an attribute or information obtained from a script corresponding to the file.

As used herein, a security entity may include a network node (e.g., a device) that enforces one or more security policies with respect to information such as network traffic, files, parked domains, etc. As an example, a security entity may be a firewall. As another example, a security entity may be implemented as a router, a switch, a DNS resolver, a computer, a tablet, a laptop, a smartphone, etc. Various other devices may be implemented as a security entity. As another example, a security may be implemented as an application running on a device, such as an anti-malware application.

As used herein, malware (or also referred to herein as malicious samples or malicious files) may include an application that engages in behaviors, whether clandestinely or not (and whether illegal or not), of which a user does not approve/would not approve if fully informed. Examples of malware include trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

Malicious users may use webpages to exploit or compromise target nodes (e.g., computers or other remote hosts). The webpages used by malicious users include malicious content and very little (if any) legitimate content/information. For example, malicious users use parked domains comprising malicious content such as in the form of hyperlinks embedded in the webpage. The webpage (e.g., landing page) for the parked domain may include information indicating that the domain is for sale or may be available, and hyperlinks purportedly providing a means to communicate with the domain owner but that may be directed to malicious exploits. Recent estimates indicate that about five percent of all URLs correspond to parked domains.

Related art systems attempt to identify parked domains and block traffic to/from the parked domains. Some related art systems implement a model (e.g., a machine learning model) to detect parked domains. However, very limited training data is available to train the model and the set of features used for model detection are not very strong. The large variation in parked domains (e.g., in page content of the parked domains) makes detection of parked domains difficult using a single model. Related art systems that use a model to detect parked domains use only HyperText Markup Language (HTML) and/or HTTP Archive format (HAR) features. Because an HTML page includes images, links, etc. in different formats, the use of a single structure to handle/detect all the various data types is difficult. Further, such related art systems generally require significant amounts of manual data labelling. One such is described in Vissers, T. et al. "Parking Sensors: A analyzing and Detecting Parked Domains", NDSS Symposium 2015. Feb. 8, 2015 (hereinafter "Vissers et al."). Vissers et al. describes at least two observations in connection with detecting parked domains: (i) a majority of the parked domains are held by the top service providers, and (ii) top 16% domain owners hold over 50% of parked domains. Various embodiments implement signatures and regex in connection with detecting parked domains. Vissers et al. does not describe use of signatures and regex to detect parked domains. The signatures or regex may be developed based on the two observations which can indicate that a majority of the parked pages from the same service providers should be similar and might be generated by the templates.

Various embodiments include a system, method, and/or device for detecting parked domains. The system uses a model to determine whether a domain is a parked domain, based on a combination of (i) a set of HAR and/or HTML, features, and (ii) a set of signature and/or pattern features, such as signature and pattern count features. In some embodiments, the system updates the implementation of using the model to detect parked domains in a manner that does not require the model to be retrained. For example, the system can update the features in the set of signature and/or pattern features based on the detection of new signatures or patterns. The system for detecting parked domains may be updated based on detection of a new signature(s) and/or pattern(s) in a manner in which the model is not required to update because the system implements count-based features for at least a subset of the set of signature and/or pattern features. For example, the detection of new signatures or patterns is converted to a count-based detection.

Various embodiments include a system, method, and/or device for detecting parked domains and/or causing an active measure to be performed in response to detection of a parked domain. In some embodiments, the system (i) obtains a set of webpages corresponding to a plurality of domains, (ii) extracts a plurality of features based on the set of webpages, (iii) detects parked domains based on the plurality of features using a machine learning model, and (iv) periodically applies automatic signature generation to detect a new pattern of parked domains without retraining the machine learning model Various embodiments include a system, method, and/or device for detecting parked domains and/or causing an active measure to be performed in response to detection of a parked domain. In some embodiments, the system (i) determines that a determination of whether a domain is a parked domain is to be performed, (ii) extracts content from the domain (e.g., information pertaining to the webpage for the domain), (iii) applies a machine learning model for detecting whether the domain is a parked domain, and (iv) in response to determining that the domain is a parked domain, causes a request for the domain to be handled in accordance with a policy for handling parked domain requests. The machine learning model is based at least in part on (i) a set of HTML and HAR features, and (ii) a set of signature count features.

Examples of HTML or HAR-based features include (i) a feature based on an external resource link ratio, (ii) a feature based on an external herf link ratio, (iii) a feature based on an average resource link length, (iv) a feature based on a ratio of link text to total text, and (v) a feature based on text to HTML ratio. Various other HTML and/or HAR-based features may be implemented.

Various embodiments implement detection of parked domains based at least in part on signature count features. A signature count feature can correspond to a count of a number of instances of a particular regex, signature, or other pattern. The system can use a set of signature count features alone, or in combination with a set of HTML and/or HAR features, to detect parked domains. Examples of signature count features include (i) a feature based on a number of hits on the HTML signatures, (ii) a feature based on a number of regex matches for domain key phrases, such as domain for sale, domain is parked, etc., (iii) a feature based on regex matches for privacy phrases, and (iv) a feature based on a number of regex matches for advertisement-related phrases, such as related links, related searches, search advertisements, etc. Various other signature count features may be implemented.

The system trains and/or uses a model to detect parked domains (e.g., determine whether a particular domain is a parked domain). Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DB SCAN) clustering, principal component analysis, etc. In some embodiments, the model is trained using an XGBoost machine learning classifier model. Inputs to the classifier (e.g., the XGBoost machine learning classifier model) are a combined feature vector or set of feature vectors and based on the combined feature vector or set of feature vectors, the classifier model determines whether the corresponding sample is malicious, or a likelihood that the sample is malicious. The combined feature vector or set of feature vectors can be based at least in part on a set of signature count features. For example, the combined feature vector or set of feature vectors is based on (i) a set of HTML and HAR features, and (ii) a set of signature count features.

In some embodiments, the system performs a malicious feature extraction in connection with generating (e.g., training) a model to detect parked domains. The malicious feature extraction can include one or more of (i) using predefined regex statements to obtain specific features from content included in the webpage for a domain(s), and (ii) using an algorithmic-based feature extraction to filter out described features from a set of webpages.

In some embodiments predefined regex statements can be set by an administrator or other user of the system. For example, the predefined regex statements are manually defined and stored at the system (e.g., stored at a security policy or within a policy for training the model). As an example, at least a subset of the regex statements can be expert-defined. The regex statements can be statements that capture certain contextual patterns. For example, parked domains may have patterns with respect to links included in the webpages, advertisements included in the webpages, or text such as privacy policies or an indication of an availability of the domains. According to various embodiments, feature extraction using regex statements identifies specific syntax comprised in an input string (e.g., the command or SQL injection strings). The manual definition/setting of regexes can be inefficient and cumbersome. According to various embodiments, the system automatically identifies the regexes based on a parsing of the webpage content, identifying link instances and text instances in the webpage content, and using an entropy computed with respect to the instance to score and filter out non-relevant instances. An example of the automatic determination/update of signatures or regexes is described in connection with FIG. 3.

According to various embodiments, the model (e.g., a detection model and/or a pre-filter model) is trained using an XGBoost machine learning process. In some implementations, a model trained using an XGBoost machine learning process is preferred because such a model is easy to migrate simple-version regex to pre-filter patterns supported by security entities (e.g., firewalls, etc.). XGBoost models were also found to improve false positive rates, and lead to better detection of exploits relative to a deep-learning model. In response to training a detection model using an XGBoost machine learning process, the system trains a pre-filter model using an XGBoost machine learning process (e.g., the same machine learning process as used to train the detection model) based at least in part on a set of features/feature vector that is derived based at least in part on the set of features used to train the detection model.

According to various embodiments, the system extracts content from a webpage for a domain and uses the content to determine one or more feature vectors to be used by a classifier (e.g., the model) in connection with determining whether the domain is a parked domain. The system determines one or more characteristics associated with the content included in the webpage such as a number of external links, an external link ratio, an amount of text, a ratio of link text to total text, an indication of whether at least part of the content matches one or more predefined regexes or other signatures or patterns, etc. The system may determine at least a subset of the one or more feature vectors based at least in part on the one or more characteristics associated with the content included in the webpage. In some embodiments, the system filters the one or more characteristics to obtain a filtered set of characteristics. The filtering of the one or more characteristics includes filtering out characteristics that are not unique to parked domains or information that is otherwise in a legitimate domain, such as contact information, an indication of a shopping cart, a phone number etc. In response to obtaining the filtered set of characteristics, the system determines the one or more features.

In some embodiments, the system obtains the content from the webpage for a particular domain from rendered HTML data for the webpage. For example, the system obtains the content from the rendered HTML data in the case that the determination of whether a domain is a parked domain is performed on a server, such as a remote server queried by a security entity, etc.

In some embodiments, the system obtains the content from the webpage for a particular domain from raw HTML data for the webpage. For example, the system obtains the content from the raw HTML data in the case that the determination of whether a domain is a parked domain is performed in-line with processing of traffic (e.g., processing requests to access domains). As an example, the content is obtained from the raw HTML data by a security entity (e.g., a firewall that detects parked domains in-line with the processing of traffic) or a client running on a client system.

According to various embodiments, the system obtains a set of signature count features based on a count of a number of instances of a particular regex, signature, or other pattern. In some embodiments, the predefined regex statements can be modified to include previously unidentified exploits or to moderate false positive rates (e.g., by removing the feature(s) giving rise to the false positive detections). Accordingly, the system and method for detecting exploits according to various embodiments are extensible and controllable to tune and better interpret the detection results.

According to various embodiments, the system for detecting exploits (e.g., malicious samples such as input strings or files) is implemented by one or more servers. The one or more servers may provide a service for one or more customers and/or security entities. For example, the one or more servers detect parked domains or determine/assess whether domains are parked domains or otherwise malicious and provide an indication of whether a domain is a parked domain to the one or more customers and/or security entities. The one or more servers can provide to a security entity the indication that a domain is a parked domain in response to a determination that the domain is a parked domain. The one or more servers can provide to a security entity the indication that a domain is a parked domain in connection with an update to a mapping of samples to indications of whether the domains are malicious or parked domains (e.g., an update to a blacklist comprising identifier(s) associated with the domains). As another example, the one or more servers determine whether a domain is a parked domain in response to a request from a customer or security entity for an assessment of whether the domain is malicious or whether the domain is a parked domain, and the one or more servers provide a result of such a determination. In some embodiments, in response to determining that a particular domain is a parked domain, the system updates a mapping of representative information/identifiers of domains to parked domains to include a record or other indication that the particular domain is a parked domain. The system can provide the mapping to security entities, end points, etc.

In some embodiments, the system receives historical information pertaining to whether a domain is a parked domain (e.g., historical datasets of parked domains and/or historical datasets of benign domains or domains that are not deemed parked domains) from a third-party service such as VirusTotal®. The third-party service may provide a set of domains (or webpages for the domains) deemed to be parked domains and a set of domains deemed to be benign. As an example, the third-party service may analyze the domain and provide an indication of whether the domain (e.g., an input string) is parked or unparked (e.g., malicious or benign), and/or a score indicating the likelihood that the domain is a parked domain. The system may receive (e.g., at predefined intervals, as updates are available, etc.) updates from the third-party service such as with newly identified parked domains, corrections to previous misclassifications, etc. In some embodiments, an indication of whether a domain in the historical datasets is a parked domain corresponds to a social score such as a community-based score or rating (e.g., a reputation score) indicating that a domain is a parked domain or is a malicious domain or likely to be a parked domain or otherwise malicious is received. The system can use the historical information in connection with training the classifier (e.g., the classifier used to determine whether a domain is a parked domain).

According to various embodiments, a security entity and/or network node (e.g., a client, device, etc.) handles traffic (e.g., domain access requests, an input string, a file, etc.) based at least in part on an indication that the domain is a parked domain or otherwise malicious and/or that the domain (or webpage for the domain) matches a domain indicated to be a parked domain. In response to receiving an indication that the traffic (e.g., the sample) is malicious, the security network and/or network node may update a mapping of samples to an indication of whether the corresponding sample is malicious, and/or a blacklist of samples. In some embodiments, the security entity and/or the network node receives a signature pertaining to a sample (e.g., a sample deemed to be malicious), and the security entity and/or the network node stores the signature of the domain (or webpage for the domain) for use in connection with detecting whether domains subject to obtained domain access request (e.g., via network traffic) are parked domains (e.g., based at least in part on comparing a signature generated for the domain, or webpage for the domain, with a signature for a domain comprised in a blacklist of domains). As an example, the signature may be a hash.

Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security entities or devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first-generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless, and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' PA Series next generation firewalls, Palo Alto Networks' VM Series firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS), and CN Series container next generation firewalls, which support various commercial container environments, including for example, Kubernetes, etc.). For example, virtualized firewalls can support similar, or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

According to various embodiments, the system for detecting an exploit (e.g., a parked domain) is implemented by a security entity. For example, the system for detecting parked domains is implemented by a firewall. As another example, the system for detecting parked domains is implemented by an application such as an anti-malware application running on a device (e.g., a computer, laptop, mobile phone, etc.). In some embodiments, the system for detecting the exploit is at least partly implemented by a security entity. For example, the security entity can analyze network traffic based at least in part on a blacklist of parked domains, a whitelist of benign domains, or a model to detect parked domains, and forward to another entity (e.g., a remote server such as in the cloud) network traffic deemed malicious or suspicious for a determination/confirmation of whether a domain is a parked domain or otherwise malicious.

According to various embodiments, the security entity (i) receives a domain access request, (ii) obtains information pertaining to the domain (e.g., content for the webpage of the domain, etc.), and (iii) determines whether the domain is a parked domain based at least in part on the information pertaining to the domain. As an example, the system determines one or more feature vectors (e.g., a combined feature vector) corresponding to the domain, and uses a classifier to determine whether the domain is a parked domain based at least in part on the one or more feature vectors. In response to determining that the domain is a parked domain, the security entity applies one or more security policies with respect to the domain. In response to determining that the domain is not a parked domain (e.g., that the domain is benign), the security entity handles the domain as benign and/or traffic with respect to such domain non-malicious traffic. In some embodiments, the security entity determines whether a domain is a parked domain based at least in part on performing a lookup with respect to a mapping of representative information or an identifier of the domain (e.g., a hash computed that uniquely identifies the domain or webpage for the domain, or another signature of the domain or webpage for the domain) to malicious domains (e.g., parked domains) to determine whether the mapping comprises matching representative information or an identifier of the sample (e.g., that the mapping comprises a record for a domain/webpage having a hash that matches the computed hash for the received domain or webpage for the domain). Examples of a hashing function to determine a hash corresponding to the file include a SHA-256 hashing function, an MD5 hashing function, an SHA-1 hashing function, etc. Various other hashing functions may be implemented.

FIG. 1 is a block diagram of an environment in which a parked domain is detected or suspected according to various embodiments.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies that selectively block traffic, such as traffic to malicious domains or parked domains. In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security platform 140. Security platform 140 can provide a variety of services, including performing static and dynamic analysis on malware samples, assessing maliciousness of domains, determining whether domains are parked domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, or domains are malicious, and providing an indication that an input string, file, or domain is malicious (or benign). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, parked domain detector 170 trains a detection model to detect parked domains (e.g., to determine whether a domain is a parked domain) In some embodiments, the detection model is used to detect domains, such as a domains subject to a domain access request, are parked domains, and in response to analyzing network traffic based on the detection model, handling traffic with respect to such domains (e.g., to block traffic or domain access requests to/from the domain).

In some embodiments, system 100 (e.g., parked domain detector 170, security platform 140, etc.) trains a model to detect parked domains. The system 100 performs a malicious feature extraction, performs an exploit feature extraction based at least in part on the HTML, and/or HAR associated with the webpage for the domain and/or a set of regexes, signatures, or other patterns associated with the webpage, and generates a set of feature vectors for training a machine learning model for detecting parked domains. The system then uses the set of feature vectors to train a machine learning model 176 (e.g., a detection model) such as based on training data that includes one or more of parked domains and unparked domains (e.g., benign or otherwise legitimate domains).

According to various embodiments, security platform 140 comprises DNS tunneling detector 138 and/or parked domain detector 170. Parked domain detector 170 is used in connection with determining whether a domain is a parked domain. In response to receiving an indication that an assessment of whether a domain is a parked domain is to be performed (e.g., a domain access request), parked domain detector 170 analyzes the domain (e.g., content included in the webpage for the domain) and determines whether the domain is a parked domain. For example, parked domain detector 170 determines one or more feature vectors for the domain (e.g., a combined feature vector based on webpage content for the domain), and uses a model 176 to determine (e.g., predict) whether the domain is a parked domain. Parked domain detector 170 determines whether the domain is a parked domain based at least in part on one or more characteristics pertaining to the webpage for the domain. In some embodiments, parked domain detector 170 receives an indication of a domain, obtains a webpage for the domain, performs a feature extraction (e.g., a feature extraction with respect to one or more characteristics for content included in the webpage, etc.), and determines (e.g., predicts) whether the domain is a parked domain based at least in part on the feature extraction results. For example, parked domain detector 170 uses a classifier (e.g., a detection model such as ML model 176) to determine (e.g., predict) whether the domain is a parked domain based at least in part on the feature extraction results. In some embodiments, the classifier corresponds to a model (e.g., the detection model) to determine whether the domain is a parked domain, and the model is trained using a machine learning process.

In some embodiments, parked domain detector 170 comprises one or more of domain parser 172, prediction engine 174, ML model 176, and/or cache 178.

Domain parser 172 is used in connection with determining (e.g., isolating) one or more characteristics associated with a sample being analyzed. Domain parser 172 can obtain content for the webpage content and extract information or characteristics pertaining to the domain/webpage from the webpage content. Examples of information that domain parser 172 obtains based on analyzing the webpage content include (i) lengths of resource links, (ii) link text), (iii) total text, (iv) amount of text, (v) amount of HTML, (vi) patterns in the HTML, (vii) an indication of whether certain content matches predefined regexes, (viii) information pertaining to the privacy policy on the webpage, (ix) information pertaining to the contact information on the webpage.

In some embodiments, one or more feature vectors corresponding to the domain (e.g., the webpage content) are determined by parked domain detector 170 (e.g., domain parser 172 or prediction engine 174). For example, the one or more feature vectors are determined (e.g., populated) based at least in part on the one or more characteristics or attributes associated with the webpage content (e.g., information pertaining to links or text included in the content, etc.). As an example, domain parser 172 uses the one or more attributes associated with the domain in connection with determining the one or more feature vectors. In some implementations, domain parser 172 determines a combined feature vector based at least in part on the one or more feature vectors corresponding to the domain. As an example, a set of one or more feature vectors is determined (e.g., set or defined) based at least in part on the model used to detect parked domains. Parked domain detector 170 can use the set of one or more feature vectors to determine the one or more attributes of patterns that are to be used in connection with training or implementing the model (e.g., attributes for which fields are to be populated in the feature vector, etc.). The model may be trained using a set of features that are obtained based at least in part on sample parked domains, such as a set of features corresponding to predefined regex statements and/or a set of feature vectors determined based on an algorithmic-based feature extraction. For example, the model is determined based at least in part on performing a malicious feature extraction (or a parked domain feature extraction) in connection with generating (e.g., training) a model to detect parked domains. The malicious feature extraction (or a parked domain feature extraction) can include one or more of (i) using predefined regex statements to obtain specific features from webpage content for domains, and (ii) using an algorithmic-based feature extraction to filter out described features from a set of raw input data. In some embodiments, the predefined regex statements are determined based on analyzing a set of sample parked domains and/or unparked domains, and determining patterns corresponding to parked domains or patterns corresponding to unparked domains, etc.

In response to receiving a sample domain for which parked domain detector 170 is to determine whether the domain is a parked domain (or a likelihood that the domain is a parked domain), parked domain detector 170 determines the one or more feature vectors (e.g., individual feature vectors corresponding to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, parked domain detector 170 (e.g., domain parser 172) provides (or makes accessible) the one or more feature vectors to prediction engine 174 (e.g., in connection with obtaining a prediction of whether the domain is a parked domain). As another example, parked domain detector 170 (e.g., domain parser 172) stores the one or more feature vectors such as in cache 178 or database 160.

In some embodiments, prediction engine 174 determines whether the domain is a parked domain, or a likelihood that the domain is a parked domain, based at least in part on one or more of (i) a mapping of domains to indications of whether the corresponding domains are malicious or parked domains, (ii) a mapping of an identifier for a domain (e.g., a hash or other signature associated with the webpage for the domain) to indications of whether the corresponding domain is malicious or a parked domain, and/or (iii) a classifier (e.g., a model trained using a machine learning process), such as ML model 176.

Prediction engine 174 is used to predict whether a domain is a parked domain. In some embodiments, prediction engine 174 determines (e.g., predicts) whether a received domain is a parked domain. According to various embodiments, prediction engine 174 determines whether a newly received domain is a parked domain based at least in part on webpage content for the domain, such as one or more characteristics of the webpage (e.g., regex statements, information pertaining to links, information pertaining to text, etc.). For example, prediction engine 174 applies a machine learning model to determine whether the newly received domain is a parked domain. Applying the machine learning model to determine whether the domain is a parked domain may include prediction engine 174 querying machine learning model 176 (e.g., with information pertaining to the webpage for the domain, one or more feature vectors, etc.). In some implementations, machine learning model 176 is pre-trained and prediction engine 174 does not need to provide a set of training data (e.g., sample parked domains and/or sample unparked domains) to machine learning model 176 contemporaneous with a query for an indication/determination of whether a particular domain is a parked domain. In some embodiments, prediction engine 174 receives information associated with whether the domain is a parked domain (e.g., an indication that the domain is a parked domain). For example, prediction engine 174 receives a result of a determination or analysis by machine learning model 176. In some embodiments, prediction engine 174 receives, from machine learning model 176, an indication of a likelihood that the domain is a parked domain. In response to receiving the indication of the likelihood that the domain is a parked domain, prediction engine 174 determines (e.g., predicts) whether the domain is a parked domain based at least in part on the likelihood that the domain is a parked domain. For example, prediction engine 174 compares the likelihood that the domain is a parked domain to a likelihood threshold value. In response to a determination that the likelihood that the domain is a parked domain is greater than a likelihood threshold value, prediction engine 174 may deem (e.g., determine that) the domain to be a parked domain.

According to various embodiments, in response to prediction engine 174 determining that the received domain is a parked domain, the system sends to a security entity an indication that the domain is a parked domain. For example, parked domain detector 170 may send to a security entity (e.g., a firewall) or network node (e.g., a client) an indication that the domain is a parked domain. The indication that the domain is a parked domain may correspond to an update to a blacklist of domains (e.g., corresponding to parked domains) such as in the case that the received domain is deemed to be a parked domain, or an update to a whitelist of domains (e.g., corresponding to unparked domains or otherwise benign domains) such as in the case that the received domain is deemed to be unparked. In some embodiments, parked domain detector 170 sends a hash or signature corresponding to the domain in connection with the indication that the domain is a parked domain or an unparked domain. The security entity or endpoint may compute a hash or signature for a domain (e.g., for content comprised in the webpage for the domain) and perform a lookup against a mapping of hashes/signatures to indications of whether domains are parked domains or unparked domains (e.g., query a whitelist and/or a blacklist). In some embodiments, the hash or signature uniquely identifies the webpage/domain.

Prediction engine 174 is used in connection with determining whether the domain is a parked domain (e.g., determining a likelihood or prediction of whether the domain is a parked domain). Prediction engine 174 uses information pertaining to the webpage for the domain (e.g., one or more characteristics, patterns, links, text, etc.) in connection with determining whether the corresponding domain is a parked domain.

Prediction engine 174 is used to determine whether the domain is a parked domain. In some embodiments, prediction engine 174 determines a set of one or more feature vectors based at least in part on information pertaining to the webpage for the domain. For example, prediction engine 174 determines feature vectors for (e.g., characterizing) one or more of (i) a set of regex statements (e.g., predefined regex statements), (ii) a set of signatures or patterns of webpages, and/or (ii) one or more characteristics or relationships determined based on an algorithmic-based feature extraction. In some embodiments, prediction engine 174 uses a combined feature vector in connection with determining whether a domain is a parked domain. The combined feature vector is determined based at least in part on the set of one or more feature vectors. For example, the combined feature vector is determined based at least in part on (i) a set of HTML, and HAR features, and (ii) a set of signature count features. In some embodiments, prediction engine 174 determines the combined feature vector by concatenating the set of feature vectors for the predefined set of regex statements and/or the set of feature vectors for the characteristics or relationships determined based on an algorithmic-based feature extraction. Prediction engine 174 concatenates the set of feature vectors according to a predefined process (e.g., predefined order, etc.).

In response to determining the set of feature vectors or the combined feature vector, prediction engine 174 uses a classifier to determine whether the domain is a parked domain (or a likelihood that the sample is malicious). The classifier is used to determine whether the domain is a parked domain based at least in part on the set of feature vectors or the combined feature vector. In some embodiments, the classifier is a machine learning classifier, such as a classifier that is trained using a machine learning process. As an example, the classifier implements the detection model to determine whether a received domain is a parked domain. Prediction engine 174 uses a result of analyzing the set of feature vectors or combined feature vector(s) with the classifier to determine whether the domain is a parked domain. In some embodiments, the classifier corresponds to machine learning model 176.

According to various embodiments, prediction engine 174 uses the set of feature vectors obtained based on a dynamic analysis of the sample to determine whether the domain is a parked domain. In some embodiments, prediction engine 174 uses the combined feature vector in connection with determining whether the domain is a parked domain. As an example, in response to determining the corresponding feature vector(s), prediction engine 174 uses a classifier to determine whether the domain is a parked domain (or a likelihood that the sample is malicious). In some embodiments, if a result of analyzing the feature vector(s) (e.g., the combined feature vector) using the classifier is less than a predefined threshold (e.g., a predefined maliciousness threshold), the system deems (e.g., determines) that the domain is not a parked domain (e.g., the domain is an unparked domain or otherwise benign). For example, if the result from analyzing the feature vector(s) indicates a likelihood of whether the domain is a parked domain, then the predefined threshold can correspond to a threshold likelihood. As another example, if the result from analyzing the feature vector(s) indicates a degree of similarity of the webpage for the domain to a webpage for a malicious page, then the predefined threshold can correspond to a threshold likelihood. In some embodiments, if a result of analyzing the feature vector(s) (e.g., the combined feature vector) using the classifier is greater than (or greater than or equal to) a predefined threshold, the system deems (e.g., determines) that the domain is a parked domain.

In response to receiving a domain to be analyzed, parked domain detector 170 can determine whether the domain corresponds to a previously analyzed domain (e.g., whether the domain matches a sample associated with historical information for which a determination of whether the domain is a parked domain has been previously computed). As an example, parked domain detector 170 determines whether an identifier or representative information corresponding to the domain is comprised in the historical information (e.g., a blacklist, a whitelist, etc.). In some embodiments, representative information corresponding to the domain is a hash or signature of the webpage for the domain. In some embodiments, parked domain detector 170 (e.g., prediction engine 174) determines whether information pertaining to a particular domain is comprised in a dataset of historical domains (e.g., historical parked domains) and historical information associated with the historical dataset indicating whether a particular domain is a parked domain (e.g., a third-party service such as VirusTotal™). In response to determining that information pertaining to a particular domain is not comprised in, or available in, the dataset of historical domains or webpages, parked domain detector 170 may deem that the domain has not yet been analyzed and parked domain detector 170 can invoke an analysis (e.g., a dynamic analysis) of the domain (e.g., the webpage for the domain) in connection with determining (e.g., predicting) whether the domain is a parked domain (e.g., parked domain detector 170 can query a classifier based on the sample in connection with determining whether the domain is a parked domain). An example of the historical information associated with the historical domains indicating whether a particular domain is a parked domain corresponds to a VirusTotal® (VT) score. In the case of a VT score greater than 0 for a particular domain, the particular domain is deemed to be a parked domain or malicious by the third-party service. In some embodiments, the historical information associated with the historical domains indicating whether a particular domain is a parked domain corresponds to a social score such as a community-based score or rating (e.g., a reputation score) indicating that a domain is a parked domain or likely to be malicious. The historical information (e.g., from a third-party service, a community-based score, etc.) indicates whether other vendors or cyber security organizations deem the particular domain is a parked domain and/or otherwise malicious.

In some embodiments, parked domain detector 170 (e.g., prediction engine 174) determines that a received domain is newly analyzed (e.g., that the domain is not within the historical information/dataset, is not on a whitelist or blacklist, etc.). Parked domain detector 170 (e.g., domain parser 172) may detect that a domain is newly analyzed in response to security platform 140 receiving the sample from a security entity (e.g., a firewall) or endpoint within a network. For example, parked domain detector 170 determines that a sample is newly analyzed contemporaneously with receipt of the sample by security platform 140 or parked domain detector 170. As another example, parked domain detector 170 (e.g., prediction engine 174) determines that a domain is newly analyzed according to a predefined schedule (e.g., daily, weekly, monthly, etc.), such as in connection with a batch process. In response to determining that a domain that is received that has not yet been analyzed with respect to whether such domain is a parked domain (e.g., the system does not comprise historical information with respect to such domain/webpage), parked domain detector 170 determines whether to use an analysis (e.g., dynamic analysis) of the domain (e.g., to query a classifier to analyze the domain or one or more feature vectors associated with the webpage for the domain, etc.) in connection with determining whether the domain is a parked domain, and parked domain detector 170 uses a classifier with respect to a set of feature vectors or a combined feature vector associated with characteristics or relationships of attributes or characteristics in the webpage for the domain.

Machine learning model 176 predicts whether a domain (e.g., a newly received domain) is a parked domain based at least in part on a model. As an example, the model is pre-stored and/or pre-trained. The model can be trained using various machine learning processes. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. According to various embodiments, machine learning model 176 uses a relationship and/or pattern of attributes, characteristics, relationships among attributes or characteristics for the domain (e.g., webpage content for the domain) and/or a training set to estimate whether the domain is a parked domain, such as to predict a likelihood that the domain is a parked domain. For example, machine learning model 176 uses a machine learning process to analyze a set of relationships between an indication of whether a domain is a parked domain (or an unparked domain or otherwise benign) and one or more attributes pertaining to the domain, and uses the set of relationships to generate a prediction model for predicting whether a particular domain is a parked domain. In some embodiments, in response to predicting that a particular domain is a parked domain, an association between the domain and the indication that the domain is a parked domain is stored such as at parked domain detector 170 (e.g., cache 178). In some embodiments, in response to predicting a likelihood that a particular domain is a parked domain, an association between the domain and the likelihood that the domain is a parked domain is stored such as at parked domain detector 170 (e.g., cache 178). Machine learning model 176 may provide the indication of whether a domain is a parked domain, or a likelihood that the sample is malicious, to prediction engine 174. In some implementations, machine learning model 176 provides prediction engine 174 with an indication that the analysis by machine learning model 176 is complete and that the corresponding result (e.g., the prediction result) is stored in cache 178.

According to various embodiments, machine learning model 176 uses one or more features in connection with predicting whether a domain is a parked domain (or a likelihood that a domain is a parked domain). For example, machine learning model 176 may be trained using one or more features. The features may be determined based at least in part on one or more characteristics or attributes pertaining to malicious samples. Examples of the features used in connection with training/applying the machine learning model 176 include (a) a set of features respectively corresponding to a set of predefined regex statements, (b) a set of features obtained based on an algorithmic-based feature extraction (e.g., obtained based on generated sample malicious traffic); etc. As an example, the set of features based on an algorithmic-based feature extraction may include a set of signature count features. Various other features may be implemented in connection with training and/or applying the model. In some embodiments, a set of features are used to train and/or apply the model. Weightings may be used to weight the respective features in the set of features used to train and/or apply the model. The weightings may be determined based at least in part on the generating (e.g., determining) the model.

Cache 178 stores information pertaining to a domain. In some embodiments, cache 178 stores mappings of indications of whether a domain is a parked domain (or likely a parked domain) to particular domains, or mappings of indications of whether a domain is a parked domain (or likely a parked domain) to hashes or signatures corresponding to domains. Cache 178 may store additional information pertaining to a set of domains such as attributes of the webpages for the domains, hashes or signatures corresponding to a webpage for a domain in the set of domains, other unique identifiers corresponding to a domain in the set of domains, etc.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious samples, detecting parked domains, or otherwise determining that certain detected network traffic is to be further analyzed (e.g., using a finer detection model).

In various embodiments, when a client device (e.g., client device 104) attempts to resolve an SQL statement or SQL command, or other command injection string, data appliance 102 uses the corresponding sample (e.g., an input string) as a query to security platform 140. This query can be performed concurrently with the resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine (e.g., using parked domain detector 170) whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may be similar to parked domain detector 170 such as by using a machine learning model to detect/predict whether the file is malicious) whether the queried file is a malicious file (or likely to be a malicious file) and provide a result back to data appliance 102 (e.g., "malicious file" or "benign file").

In some embodiments, parked domain detector 170 provides to a security entity, such as data appliance 102, an indication whether a domain is a parked domain. For example, in response to determining that the domain is a parked domain, parked domain detector 170 sends an indication that the domain is a parked domain to data appliance 102, and the data appliance 102 may in turn enforce one or more security policies based at least in part on the indication that the domain is a parked domain. The one or more security policies may include isolating/quarantining the webpage content for the domain, blocking access to the domain, isolating/deleting the domain access request for the domain, ensuring that the domain is not resolved, alerting or prompting the user of the client system the maliciousness of the domain prior to the user viewing the webpage, etc. As another example, in response to determining that the domain is a parked domain, parked domain detector 170 provides to the security entity an update of a mapping of domains (or hashes, signatures, or other unique identifiers corresponding to webpages for the domain) to indications of whether a corresponding domain is a parked domain, or an update to a blacklist for parked domains or a whitelist for benign domains (e.g., identifying domains that are not deemed parked domains).

Figure 2:
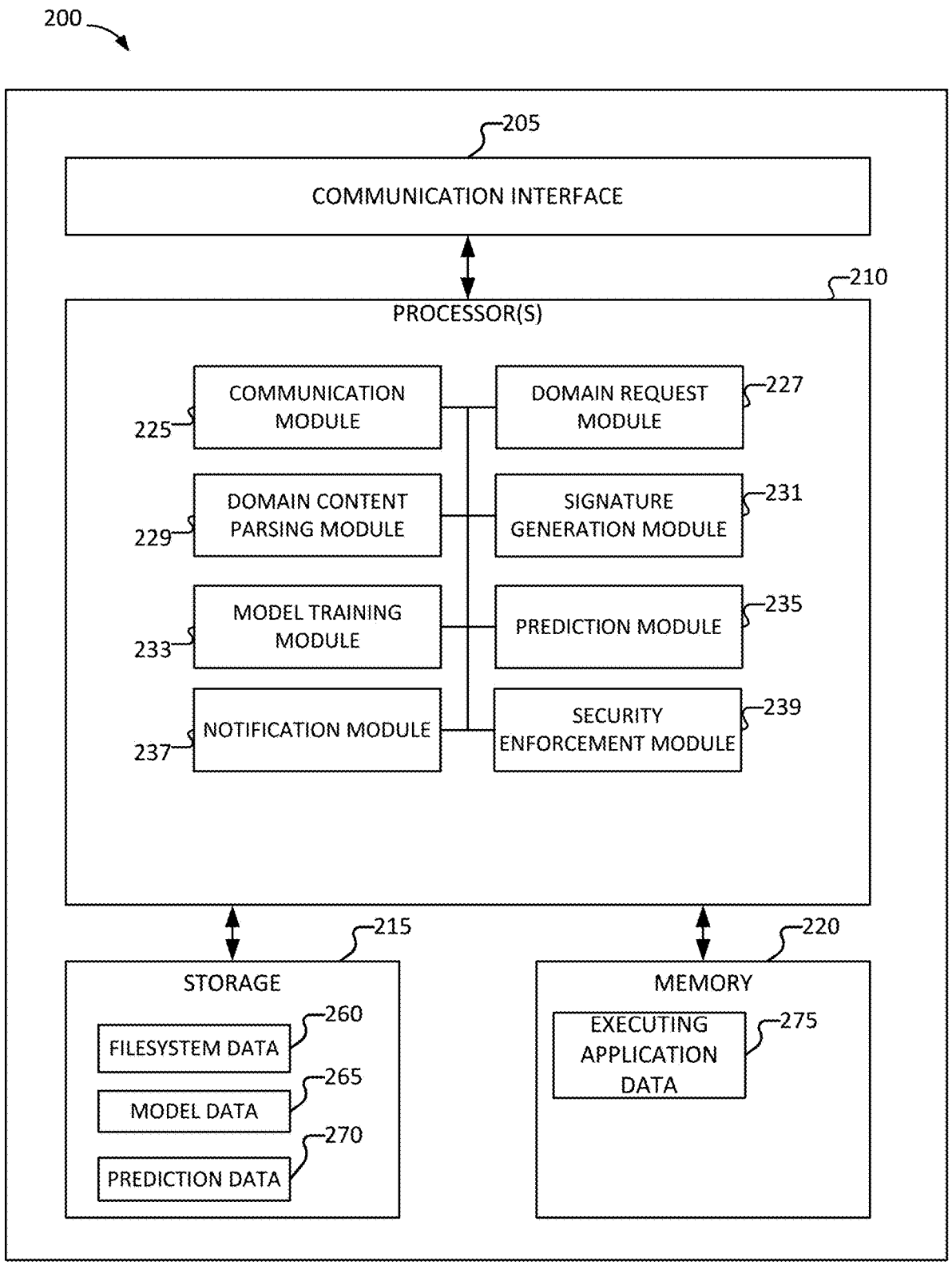
FIG. 2 is a block diagram of a system to detect a parked domain according to various embodiments.

FIG. 2 is a block diagram of a system to detect a parked domain according to various embodiments. According to various embodiments, system 200 is implemented in connection with system 100 of FIG. 1, such as for parked domain detector 170. In various embodiments, system 200 is implemented in connection with process 300 of FIG. 3, process 700 of FIG. 7, process 800 of FIG. 8, process 900 of FIG. 9, process 1000 of FIG. 10, process 1100 of FIG. 11, and/or process 1200 of FIG. 12. System 200 may be implemented in one or more servers, a security entity such as a firewall, and/or an endpoint.

System 200 can be implemented by one or more devices such as servers. System 200 can be implemented at various locations on a network. In some embodiments, system 200 implements parked domain detector 170 of system 100 of FIG. 1. As an example, system 200 is deployed as a service, such as a web service (e.g., system 200 determines whether an input string or received file is malicious, and provides such determinations as a service). The service may be provided by one or more servers. For example, system 200 or the parked domain detector is deployed on a remote server that monitors or receives domains (or domain access requests) that are transmitted within or into/out of a network and determines whether the domain is a parked domain, and sends/pushes out notifications or updates pertaining to the domain such as an indication whether a domain is a parked domain. As another example, the malicious sample detector is deployed on a firewall. In some embodiments, part of system 200 is implemented as a service (e.g., a cloud service provided by one or more remote servers) and another part of system 200 is implemented at a security entity or other network node such as a client device.

According to various embodiments, in response to receiving the domain (e.g., a domain access request) to be analyzed to determine whether the sample is malicious, system 200 uses a classifier to determine whether the domain is a parked domain (or to determine a likelihood that the domain is a parked domain). For example, system 200 uses the classifier to provide a prediction of whether the domain is a parked domain. The prediction can include an indication of a likelihood that the domain is a parked domain. System 200 determines one or more feature vectors corresponding to the domain (or webpage for the domain) and uses the classifier to analyze the one or more feature vectors in connection with determining whether the domain is a parked domain.

In some embodiments, system 200 (*i*) receives a domain (or a domain access request), (ii) obtains a webpage for the domain, (iii) performs a feature extraction, and (iv) uses a classifier to determine whether the domain is a parked domain or likely to be a parked domain based at least in part on the feature extraction results. System 200 can perform an active measure (or cause an active measure to be performed) in response to determining that a domain is a parked domain.

In the example shown, system 200 implements one or more modules in connection with predicting whether a domain is a parked domain, determining a likelihood that the domain is a parked domain, and/or providing a notice or indication of whether a domain is a parked domain. System 200 comprises communication interface 205, one or more processors 210, storage 215, and/or memory 220. One or more processors 210 comprises one or more of communication module 225, domain request module 227, domain content parsing module 229, signature generation module 231, model training module 233, prediction module 235, notification module 237, and security enforcement module 239.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides to communication module 225 information received by system 200. Communication module 225 is configured to receive an indication of domains to be analyzed (or domain access requests indicating a domain), such as from network endpoints or nodes such as security entities (e.g., firewalls), database systems, query systems, etc. Communication module 225 is configured to obtain a webpage (e.g., webpage content) for a domain to be analyzed. Communication module 225 is configured to query third party service(s) for information pertaining to domains (e.g., services that expose information for domains such as third-party scores or assessments of maliciousness of domains or indications of whether domains are parked domains, a community-based score, assessment, or reputation pertaining to domains, a blacklist for domains, and/or a whitelist for domains, etc.). For example, system 200 uses communication module 225 to query the third-party service(s). Communication module 225 is configured to receive one or more settings or configurations from an administrator. Examples of the one or more settings or configurations include configurations of a process determining whether a domain is a parked domain, a format or process according to which a combined feature vector is to be determined, a set of feature vectors to be provided to a classifier for determining whether the domain is a parked domain, a set of regex statements for which feature vectors are to be determined (e.g., a set of predefined regex statements, or an update to a stored set of regex statements, etc.), a set of predefined signatures to be assessed or counted, information pertaining to a whitelist of domains (e.g., samples that are unparked domains, or that are otherwise not deemed suspicious or malicious), information pertaining to a blacklist of domains (e.g., domains that are deemed to be parked domains, or otherwise suspicious or malicious and for which traffic is to be quarantined, deleted, or otherwise to be restricted from being executed), etc.

In some embodiments, system 200 comprises domain request module 227. System 200 uses the domain request module 227 to obtain an indication of a domain to be analyzed (e.g., a domain for which an assessment of whether the domain is a parked domain is to be performed), etc. The indication of the domain to be analyzed can be obtained from a client terminal or security entity, such as in response to monitoring traffic for the terminal or network. In response to detecting a domain access request, etc., the client terminal or security entity may query system 200 (e.g., domain request module 227) for a determination of whether the domain is a parked domain.

In some embodiments, system 200 comprises domain content parsing module 229. System 200 uses the domain request module 227 to obtain webpage content for the domain and to parse the webpage content to obtain information pertaining to the domain. For example, domain content parsing module 229 determines one or more characteristics pertaining to the domain. Examples of the one or more characteristics obtained by domain content parsing module 229 include information pertaining to links in the webpage content (e.g., an indication of whether a particular link is an external link or an internal link, a number of links, a length of a link, an amount of link text), information pertaining to text included in the webpage content, a ratio of a link text to total text, patterns or signatures included in the webpage content, an indication of whether the webpage content includes particular signatures or patterns such as key phrases or sections on the webpage, information pertaining to advertisements, etc.

In some embodiments, domain content parsing module 229 obtains the webpage content, renders the webpage, and determines the one or more characteristics pertaining to the domain based on the rendered webpage. Domain content parsing module 229 can render the webpage in an isolated environment, such as a sandbox environment.

In some embodiments, system 200 comprises signature generation module 231. System 200 uses signature generation module 231 to define a signature or pattern to be assessed in a webpage for a domain. Signature generation module 231 can detect patterns or signatures associated with parked domains from webpage content. For example, signature generation module 231 obtains a set of historical or sample domains (e.g., webpage content for the domains) and determines patterns or signatures that are associated with (e.g., indicative of) parked domains, and/or patterns or signatures that are associated with unparked domains.

In some embodiments, system 200 comprises model training module 233. System 200 uses model training module 233 to train a machine learning model. Model training module 233 can obtain a set of training data, including a set of historical domains classified as parked domains and/or a set of historical domains classified as unparked domains. In response to obtaining the set of training data, model training module 233 determines one or more features for a model that determines whether a domain is a parked domain or an unparked domain. Model training module 233 may query signature generation module 231 to determine relationships (e.g., patterns, signatures, etc.) associated with the webpages for domains included in the set of training data.

In response to obtaining the set of training data, system 200 uses model training module 233 to perform a feature extraction (e.g., parked domain feature extraction). The parked domain feature extraction can include one or more of (i) using predefined regex statements, signatures, or patterns, and (ii) using an algorithmic-based feature extraction to filter out described features from a set of raw input data (e.g., webpage content for domains in the set of training data).

In some embodiments, predefined regex statements, signatures, or patterns can be set by an administrator or other user of the system. For example, the predefined regex statements, signatures, or patterns are manually defined and stored at the system (e.g., stored at a security policy or within a policy for training the model). As an example, at least a subset of the regex statements, signatures, or patterns can be expert-defined. The regex statements can be statements that capture certain contextual patterns. For example, malicious structured statements are usually part of a code language. According to various embodiments, feature extraction using regex statements identifies specific syntax comprised in website content.

In some embodiments, system 200 comprises model training module 233. System 200 uses model training module 233 to determine a model (e.g., a detection model) for determining whether a domain is a parked domain, or relationships (e.g., features) between characteristics of a domain and maliciousness of the domain or indications that the domain is a parked domain. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, model training module 233 trains an XGBoost machine learning classifier model. Inputs to the classifier (e.g., the XGBoost machine learning classifier model) are a combined feature vector or set of feature vectors and based on the combined feature vector or set of feature vectors, the classifier model determines whether the corresponding domain is a parked domain, or a likelihood that the domain is a parked domain.

In response to obtaining a domain (or a request to analyze a domain), system 200 (e.g., prediction module 235) may determine whether the domain corresponds to a previously analyzed domain (e.g., whether the domain matches a domain associated with historical information for which a determination of whether the domain is a parked domain has been previously computed). As an example, system 200 (e.g., prediction module 235) queries a database or mapping of previously analyzed domains and/or historical information such as blacklists of domains, and/or whitelists of domains in connection with determining whether the domain was previously analyzed. In some embodiments, in response to determining that the domain does not correspond to a previously analyzed sample, system 200 uses a classifier (e.g., a model such as a model trained using a machine learning process) to determine (e.g., predict) whether the domain is a parked domain. In some embodiments, in response to determining that the domain corresponds to a previously analyzed domain, system 200 (e.g., and/or prediction module 235) obtains an indication of whether the corresponding previously analyzed domain is a parked domain. System 200 can use the indication of whether the corresponding previously analyzed domain is a parked domain as an indication of whether the received domain is a parked domain.

In some embodiments, system 200 comprises prediction module 235. System 200 uses prediction module 235 to determine one or more feature vectors for (e.g., corresponding to) the domain. For example, system 200 uses prediction module 235 to determine a set of feature vectors or a combined feature vector to use in connection with determining whether a domain is a parked domain (e.g., using a detection model). In some embodiments, prediction module 235 determines a set of one or more feature vectors based at least in part on information pertaining to the domain, such as one or more characteristics determined based at least in part on the webpage content for the domain. For example, prediction module 235 determines feature vectors for (e.g., characterizing) the one or more of (i) a set of HTML, and HAR features, and (ii) a set of signature count features.

In some embodiments, system 200 uses prediction module 235 to determine (e.g., predict) whether a sample is malicious or likelihood that the sample is malicious. Prediction module 235 uses a model (e.g., the detection model) such as a machine learning model trained by model training module 233 in connection with determining whether a domain is a parked domain or likelihood that the domain is a parked domain. For example, prediction module 235 uses the XGBoost machine learning classifier model (e.g., the detection model) to analyze the combined feature vector to determine whether the domain is a parked domain.

In some embodiments, system 200 comprises notification module 237. System 200 uses notification module 237 to provide an indication of whether the domain is a parked domain (e.g., to provide an indication that the domain is a parked domain). For example, notification module 237 obtains an indication of whether the domain is a parked domain (or a likelihood that the domain is a parked domain) from prediction module 235 and provides the indication of whether the domain is a parked domain to one or more security entities and/or one or more endpoints. As another example, notification module 237 provides to one or more security entities (e.g., a firewall), nodes, or endpoints (e.g., a client terminal) an update to a whitelist of domains and/or a blacklist of domains. According to various embodiments, notification module 237 obtains a hash, signature, or other unique identifier associated with the domain (e.g., a webpage for the domain), and provides the indication of whether the sample is malicious in connection with the hash, signature, or other unique identifier associated with the sample.

According to various embodiments, the hash of a domain corresponds to a hash of the domain name, the IP address, or website content for the domain using a predetermined hashing function (e.g., an MD5 hashing function, etc.). A security entity or an endpoint may compute a hash of a received domain. The security entity or an endpoint may determine whether the computed hash corresponding to the domain is comprised within a set such as a whitelist of benign domains, and/or a blacklist of domains, etc. If a signature for a received domain (e.g., a domain subject to an access request) is included in the set of signatures for parked domains (e.g., a blacklist of parked domains), the security entity or an endpoint can prevent the transmission of website content for the domain, or otherwise prevent access to the domain.

In some embodiments, system 200 comprises security enforcement module 239. System 200 uses security enforcement module 239 to enforce one or more security policies with respect to information such as network traffic, domain access requests, input strings, files, etc. Security enforcement module 239 enforces the one or more security policies based on whether the sample is determined to be malicious. As an example, in the case of system 200 being a security entity or firewall, system 200 comprises security enforcement module 239. Firewalls typically deny or permit network transmissions based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, information obtained via a web interface or other user interface such as an interface to a database system (e.g., an SQL interface), and/or other file transfers.

According to various embodiments, storage 215 comprises one or more of filesystem data 260, model data 265, and/or prediction data 270. Storage 215 comprises a shared storage (e.g., a network storage system) and/or database data, and/or user activity data.

In some embodiments, filesystem data 260 comprises a database such as one or more datasets (e.g., one or more datasets for domains, such as parked domains or unparked domains, mappings of indicators of parked domains to domains or hashes, signatures or other unique identifiers of domains, mappings of indicators of benign domains or unparked domains to domains or hashes, signatures or other unique identifiers of domains, etc.). Filesystem data 260 comprises data such as historical information pertaining to domains (e.g., indications of whether domains are parked domains), a whitelist of domains deemed to be safe (e.g., not suspicious, benign, unparked domains, etc.), a blacklist of domains deemed to be parked domains or otherwise suspicious or malicious (e.g., domains for which a deemed likelihood that the domain is a parked domain exceeds a predetermined/preset likelihood threshold), information associated with suspicious or malicious domains, etc.

Model data 265 comprises information pertaining to one or more models used to determine whether a domain is a parked domain or a likelihood that a domain is a parked domain. As an example, model data 265 stores the classifier (e.g., the XGBoost machine learning classifier model(s) such as a detection model) used in connection with a set of feature vectors or a combined feature vector. Model data 265 comprises a feature vector that may be generated with respect to each of the one or more of (i) a set of HTML and HAR features, and (ii) a set of signature count features. In some embodiments, model data 265 comprises a combined feature vector that is generated based at least in part on the one or more feature vectors corresponding to each of the one or more of (i) a set of HTML and HAR features, and (ii) a set of signature count features.

Prediction data 270 comprises information pertaining to a determination of whether the domains analyzed by system 200 are a parked domain. For example, prediction data 270 stores an indication that the domain is a parked domain, an indication that the domain is an unparked domain, etc. The information pertaining to a determination can be obtained by notification module 237 and provided (e.g., communicated to the applicable security entity, endpoint, or other system). In some embodiments, prediction data 270 comprises hashes or signatures for domains such as domains that are analyzed by system 200 to determine whether such domains are parked domains, or a historical dataset that has been previously assessed to determine whether the domains are parked domains, such as historical determinations provided by a third party. Prediction data 270 can include a mapping of hash values or other identifiers associated with domains to indications of whether the domain is a parked domain (e.g., an indication that the corresponding domain is a parked domain or an unparked domain, etc.).

According to various embodiments, memory 220 comprises executing application data 275. Executing application data 275 comprises data obtained or used in connection with executing an application such as an application executing a hashing function, an application to extract information from webpage content, an input string, an application to extract information from a file, or other sample, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious input strings, suspicious files, or suspicious or unparked domains, a document preparation application, a report preparation application, a user interface application, a data analysis application, an anomaly detection application, a user authentication application, a security policy management/update application, etc.).

Figure 3:
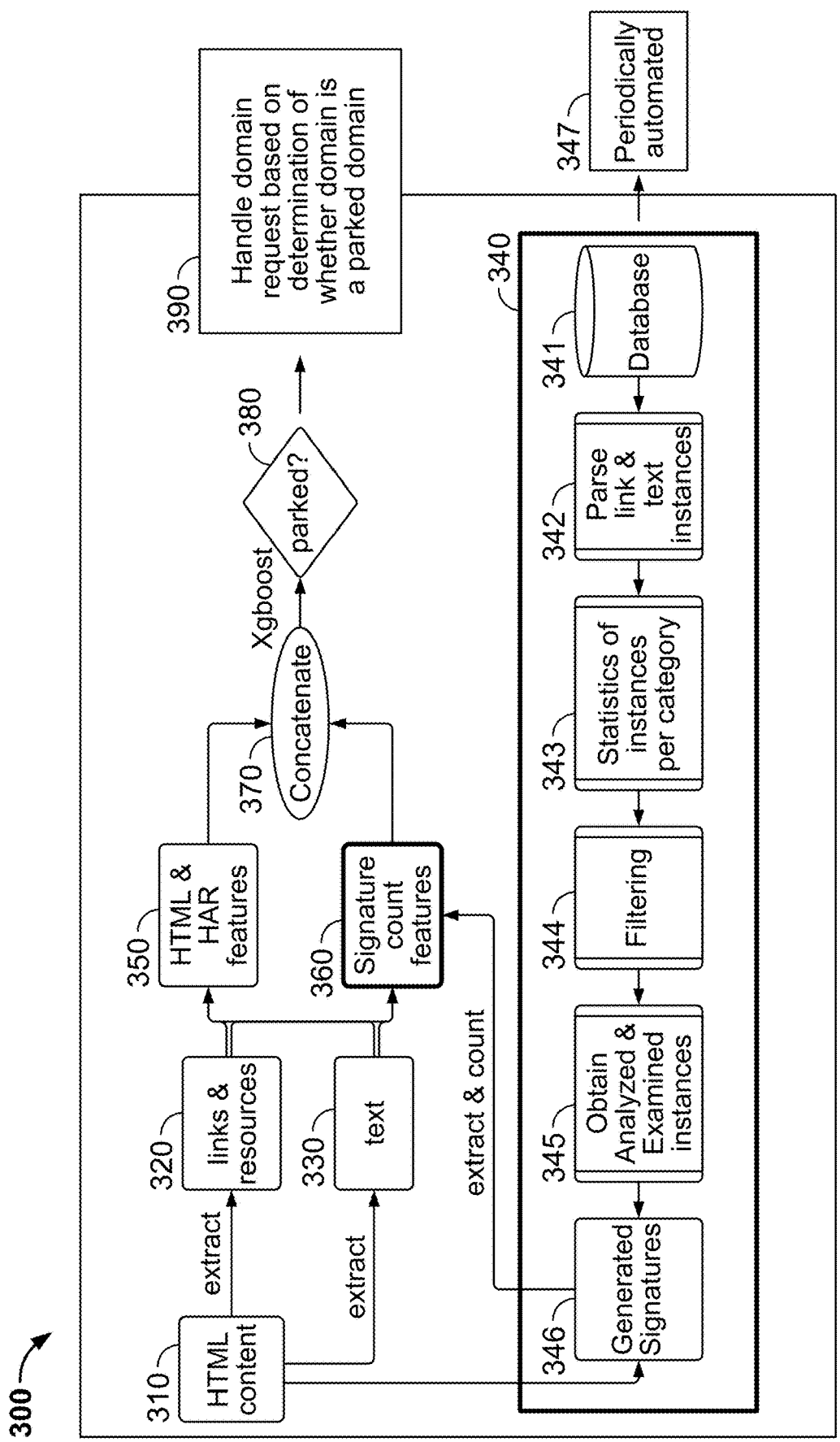
FIG. 3 is a block diagram of a system for detecting parked domains according to various embodiments.

FIG. 3 is a block diagram of a process for detecting parked domains according to various embodiments. According to various embodiments, process 300 is implemented at least in part by system 100 of FIG. 1, such as for parked domain detector 170, and/or system 200 of FIG. 2. In various embodiments, process 300 is implemented in connection with process 700 of FIG. 7, process 800 of FIG. 8, process 900 of FIG. 9, process 1000 of FIG. 10, process 1100 of FIG. 11, and/or process 1200 of FIG. 12. Process 300 may be implemented in one or more servers, a security entity such as a firewall, and/or an endpoint.

At 310, webpage content for a domain is obtained. The domain may be subject to a domain access request (e.g., the domain is identified in the domain access request) and the system obtains webpage content for the domain. The webpage content can correspond to, or include HTML content.

At 320, links and resources are extracted from the webpage content. In some embodiments, the system parses the HTML content to obtain links or resources included in the webpage for the domain.

At 330, text is extracted from the webpage content. In some embodiments, the system parses the HTML content to obtain the text included in the webpage for the domain.

At 340, signatures and/or regex phrases are generated or updated based at least in part on the webpage content and/or content for a set of webpages (e.g., training data). The system detects signatures, regex phrases, or other patterns associated with (e.g., indicative of) parked domains or signatures, regex phrases, or other patterns associated with unparked domains. In some embodiments, 340 is periodically performed, such as to update the signatures and/or regex phrases based on current content for webpages. 340 may be performed after a predetermined amount of time has lapsed since a last time the signatures and/or regex phrases were updated. For example, at 347, 340 is periodically automated.

According to various embodiments, the generating and/or updating the signatures and/or regex phrases can include 341, 342, 343, 344, 345, and 346.

At 341, content for a set of webpages is obtained from a database. The database can store historical content for webpages. In some embodiments, the database stores an indication of whether the various webpages included in the set of webpages are parked domains. In some embodiments, the database stores large unlabeled data that is processed in connection with generating the signatures.

In response to obtaining the content from the database, the system applies a systemic data mining approach to extract signatures and regex phrases (e.g., predefined regex statements).

At 342, HTML source strings are parsed into link instances and text sentence instances. The inputs are HTML parsed links and all text strings, and the outputs are link instances and sentence instances. An example of a link instance is https://www.google.com/adsense/domains/caf.js. An example of a text instance is "All rights reserved."

At 343, statistics associated with instances per category are obtained. In some embodiments, the system uses a hash table and a hashing of each link instance and text instance with category information from each website. Table 1 provides an example of the statistics associated with various link instances. Table 2 provides an example of the statistics associated with various text instances.

TABLE 1

| Link Instance | Frequency | Statistics | Scores | Proposed category/ classification | Keep? |
|---|---|---|---|---|---|
| https://www.google.com/adsense/domain/caf.js | 51947 | {parked: 1647; unparked: 50,300} | {parked: 0.0327} | Shopping | False |
| https://img1.wsimg.com/parking-lander/staic/js/main.65749e4a.chunk | 22195 | {parked: 22152; unparked: 43} | {parked: 0.9914} | Parked | True |
| https://img1.wsimg.com/parking-lander/static/js/2.0551a46c.chunk | 15898 | {parked: 15898; unparked: 0} | {parked: 1.0} | Parked | True |
| https://www.google.com/afs/ads/i/iframe.html#slave-1-1 | 5143 | {parked: 5128; unparked: 15} | {parked: 0.9854} | Parked | True |
| http://www.google.com/adsense/domain/caf.js | 4917 | {parked: 4906; unparked: 11} | {parked: 0.9881} | Parked | True |
| Javascript:void(0);::=Privacy Policy | 4531 | {parked: 4504; unparked: 27} | {parked: 0.9739} | Parked | True |
| https://www.cloudflare.com/5xx-error-landing::=Cloudflare | 3864 | {parked: 3800; unparked: 64} | {parked: 0.9834} | Parked | True |
| Javascript:void(0)::= | 3787 | {parked: 500; unparked: 3287 (e.g., "shopping:") 1200, etc.} | {parked: 0.0233} | Shopping | False |

TABLE 2

| Text Instance | Frequency | Statistics | Scores | Proposed category/ classification | Keep? |
|---|---|---|---|---|---|
| All Rights Reserved. | 5189 | {parked: 4639; unparked: 550} | {parked: 0.7402} | Parked | True |
| The Sponsored Listings displayed above are served automatically by a third party | 3652 | {parked: 3652; unparked: 0} | {parked: 1.0} | Parked | True |
| Neither Parking crew nor the domain owner maintain any relationship with the advertisers | 3623 | {parked: 3623; unparked: 0} | {parked: 1.0} | Parked | True |
| This domain is registered at Namecheap | 3613 | {parked: 3613; unparked: 0} | {parked: 1.0} | Parked | True |
| Please check back later! | 3612 | {parked: 3612; unparked: 0} | {parked: 1.0} | Parked | True |
| All rights reserved. | 1161 | {parked: 2; unparked: 1159} | {parked: 0.0113} | Parked | False |
| We hope you find what you are searching for! | 1098 | {parked: 1086; unparked: 12} | {parked: 0.9524} | Parked | True |
| NameSilo offers the cheapest domains on the Internet | 790 | {parked: 789; unparked: 1} | {parked: 0.9847} | Parked | True |
| Industry Leading Domain Security | 790 | {parked: 789; unparked: 1} | {parked: 0.9847} | Parked | True |
| Disclaimer: Sedo maintains no relationship with third party advertisers | 531 | {parked: 525; unparked: 6} | {parked: 0.9412} | Parked | True |

At 344, a filtering is performed with respect to the link instances and the text instances. In some embodiments, the system implements an adjusted inverted maximum entropy to score and filter out non-relevant instances (e.g., text instances and/or link instances). For example, the system filters out instances pertaining to a phone number included in the webpage content, or a shopping cart link, etc.

$$H = -\Sigma_{i=1}^{C} p_i \log_2 p_i \quad (1)$$

$$S = 1.0 - H/\log_2(C) \quad (2)$$

In equation (1) above, each $p_i$ is the probability of the instance belonging to a specific category. H is the entropy. In equation (2) above, S is the scaling score for such instance. If an instance is uniformly distributed over all categories, the scaling score factor would be 0; and if the distribution of instances over all categories is skewed, the scaling score factor would be closer to 1.

At 345, the remaining instances after filtering non-relevant instances are obtained. The system analyzes selected instances for a parked category and/or analyzes each webpage including such instances to remove pages for which a false positive is likely.

At 346, a set of features including the discovered signatures and/or regex pattern counts are generated. In some embodiments, such features include (i) the number of hits on the link signatures, (ii) the number of regex matches to a variety of regex patterns, etc.

At 350, HTML feature and/or HAR features are generated based at least in part on the parsing of the webpage content. Examples of the HTML and/or HAR features include (i) an external resource link ratio, (ii) a link ratio, (iii) an average link length, (iv) link to text ratio, (v) text to HTML ratio, etc.

At 360, signature count features are determined based at least in part on the extracted website content. The system determines signature count features pertaining to signatures, regex phrases, or other patterns associated with whether a domain is a parked domain. In some embodiments, the system uses the set of features generated at 346 and the extracted content to determine the signature count features.

At 370, the HTML, and/or HAR features, and the signature count features are concatenated. For example, the system determines a combined feature vector based on the HTML and/or HAR features, and the signature count features.

At 380, the concatenation of the HTML and/or HAR features, and the signature count features is provided to a classifier that determines (or predicts) whether the domain is a parked domain. The system uses the classifier (e.g., a model) to determine whether the domain is a parked domain based at least in part on a combined feature vector corresponding to the HTML and/or HAR features, and the signature count features.

At 390, a domain request (e.g., a domain access request) is handled based on the determination of whether the domain is a parked domain. The domain request can be handled according to a policy for handling domain requests with respect to parked domains or a policy for handling domain requests with respect to unparked domains, as applicable.

Figure 4:
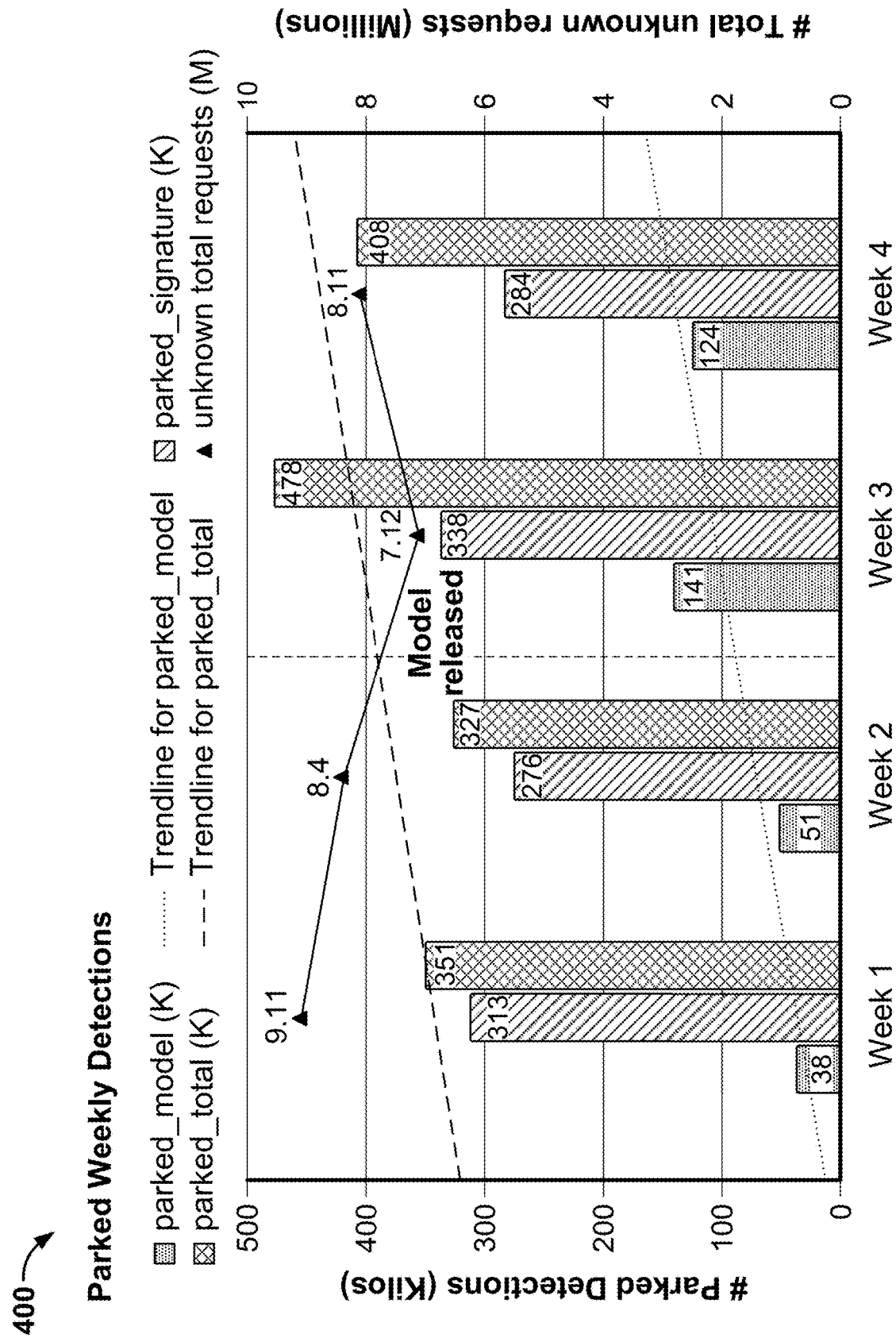
FIG. 4 is an illustration of performance of an example system for detecting parked domains according to various embodiments.

FIG. 4 is an illustration of performance of an example system for detecting parked domains according to various embodiments. Results 400 illustrate a performance of a system for detecting parked domains. In the example shown, for each week in Results 400, the leftmost bar corresponds to the parked model, the bar second from the left corresponds to a parked-signature, and the rightmost bar corresponds to a total parked domain.

As illustrated in FIG. 4, the model according to various embodiments (e.g., trained using at least signature count features) is deployed after Week 2. After deployment of the model, the number of detections of parked domains is determined using both the parked model (e.g., the HTML and HAR features) and the signature count model (e.g., the signature count features).

Table 3 below illustrates performance of an implementation of an XGBoost model trained according to various embodiments. As illustrated in Table 3, the number of false negatives and false positives is significantly lower for a model that uses both (i) HTML and/or HAR features and (ii) signature count features. Further, the precision of the XGBoost model using both sets of features is higher than a model that uses only HTML and HAR features, or signature count features. The adding of signature and/or regex features in connection HTML and/or HAR features increases performance by about twenty percent relative to traditional models that implement only HTML, and/or HAR features.

TABLE 3

| Model | Precision | Recall | F-Score | True Positive | False Positive | False Negative | Parked/Total |
|---|---|---|---|---|---|---|---|
| Xgboost (HTML features only) | 92.12% | 64.64% | 75.97% | 479 | 41 | 262 | 741/2713 |
| Xgboost (regex only) | 99.12% | 91.23% | 95.01% | 676 | 6 | 65 | 741/2713 |
| Xgboost (combined model) | 99.27% | 91.63% | 95.30% | 679 | 5 | 62 | 741/2713 |

Table 4 below provides a summary of results 400. The combined use of HTML and/or HAR features and a set of signature count features (e.g., signature/regex features) improves the detection of parked domains by about 3 times and the false positives are significantly reduced.

TABLE 4

| Week | Detections using HTML/HAR model (k) | Detections using Signature model (k) | Detections using combined model according to various embodiments (k) | Unknown total domain requests (M) | Average # of detections using HTML/HAR model (k) | Average # of detections using Signature model (k) | Average # of detections using combined model according to various embodiments (k) | Average number of unknown requests (M) | Release Cycle |
|---|---|---|---|---|---|---|---|---|---|
| 1 | 38 | 313 | 351 | 9.11 | 44.5 | 294.5 | 339 | 8.755 | Pre-deployment |
| 2 | 51 | 276 | 327 | 8.4 | | | | | |
| 3 | 141 | 338 | 478 | 7.12 | 132.5 | 311 | 443 | 7.615 | Post-deployment |
| 4 | 124 | 284 | 408 | 8.11 | | | | | |

According to various embodiments, the use of a combined model (e.g., a model using HTML/HAR features and signature count features) to detect whether a domain is a parked domain extends detection of parked domains to webpage content including foreign languages. The combined model uses signature count features that are generated through statistics of large unlabeled data which thus enables detection of instances using foreign languages.

Figure 5:
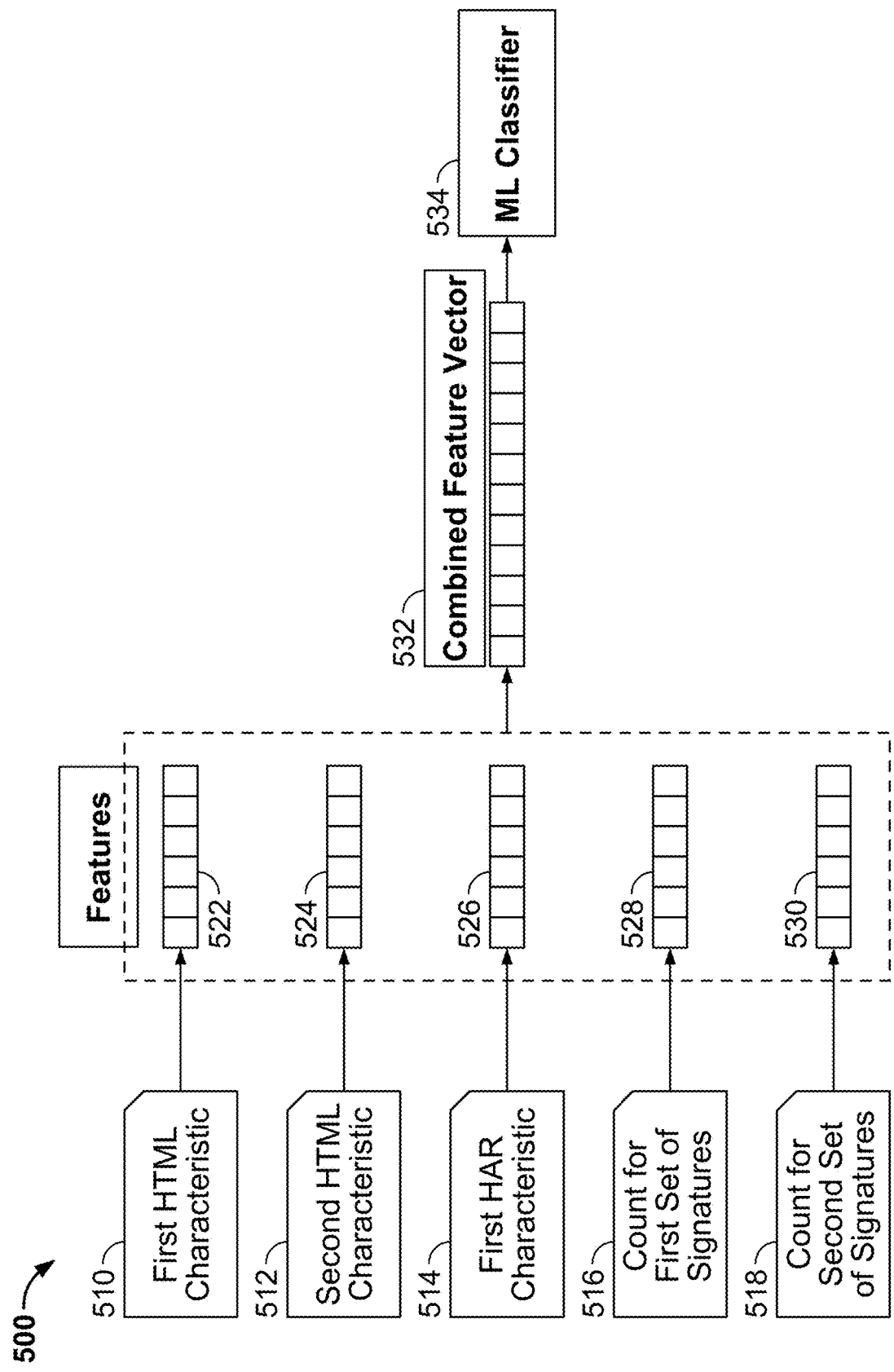
FIG. 5 is an illustration of a method for generating a combined feature vector using a sample according to various embodiments.

FIG. 5 is an illustration of a method for generating a combined feature vector using a sample according to various embodiments. Process 500 may be implemented at least in part by system 100 of FIG. 1 and/or system 200 of FIG. 2. In various embodiments, a machine learning system is implemented to determine custom features. The custom features may be determined based on a predefined set of regex statements and/or an algorithmic-based feature extraction.

In the example shown, feature extraction with respect to detecting exploits includes a plurality of features such as a subset of features extracted based on a predefined set of regex statements, and a subset of features extracted based on an algorithmic-based feature extraction. For example, the plurality of features includes feature(s) for a sample first HTML characteristic 510, feature(s) for a sample second HTML characteristic 512, feature(s) for a sample first HAR characteristic 514, feature(s) for a sample count for a first set of signatures 516, and feature(s) for a sample count for a second set of signatures 518. Various other features can be implemented. The plurality of features (e.g., features 510-518) can be determined based on the performing of a malicious feature extraction (e.g., unparked domains feature extraction).

In response to receiving a sample (e.g., an input string to be analyzed), the system analyzes the sample with respect to the various features. In some embodiments, the system obtains one or more feature vectors with respect to the sample. As an example, the system obtains one or more feature vectors to characterize the sample. In the example shown in FIG. 5, the system populates a feature vector 522 corresponding to features for the sample first HTML characteristic, a feature vector 524 corresponding to features for the sample second HTML characteristic, a feature vector 526 corresponding to features for the sample first HAR characteristic, a feature vector 528 corresponding to features for the sample count for a first set of signatures, and a feature vector 530 corresponding to features for the sample count for a second set of signatures.

In response to obtaining the one or more feature vectors, the system can generate a combined feature vector 532. In some embodiments, the system determines the combined feature vector 532 by concatenating the set of feature vectors for the HTML and/or HAR features, and the signature count features. In some embodiments, the system concatenates the set of feature vectors according to a predefined process (e.g., predefined order, etc.).

A feature vector can be used as an input to a predictor function (e.g., a linear predictor function) to obtain a binary classification. A feature vector is an n-dimensional vector of numerical features that represent an object. Machine learning processes typically use a numerical representation of objects to process and/or perform a statistical analysis.

In response to obtaining combined feature vector 532, the system uses combined feature vector 532 as an input to a classifier 534 (e.g., a machine learning classifier). The system uses an output of classifier 534 as a prediction or determination of whether the corresponding sample is a parked domain.

Figure 6A:
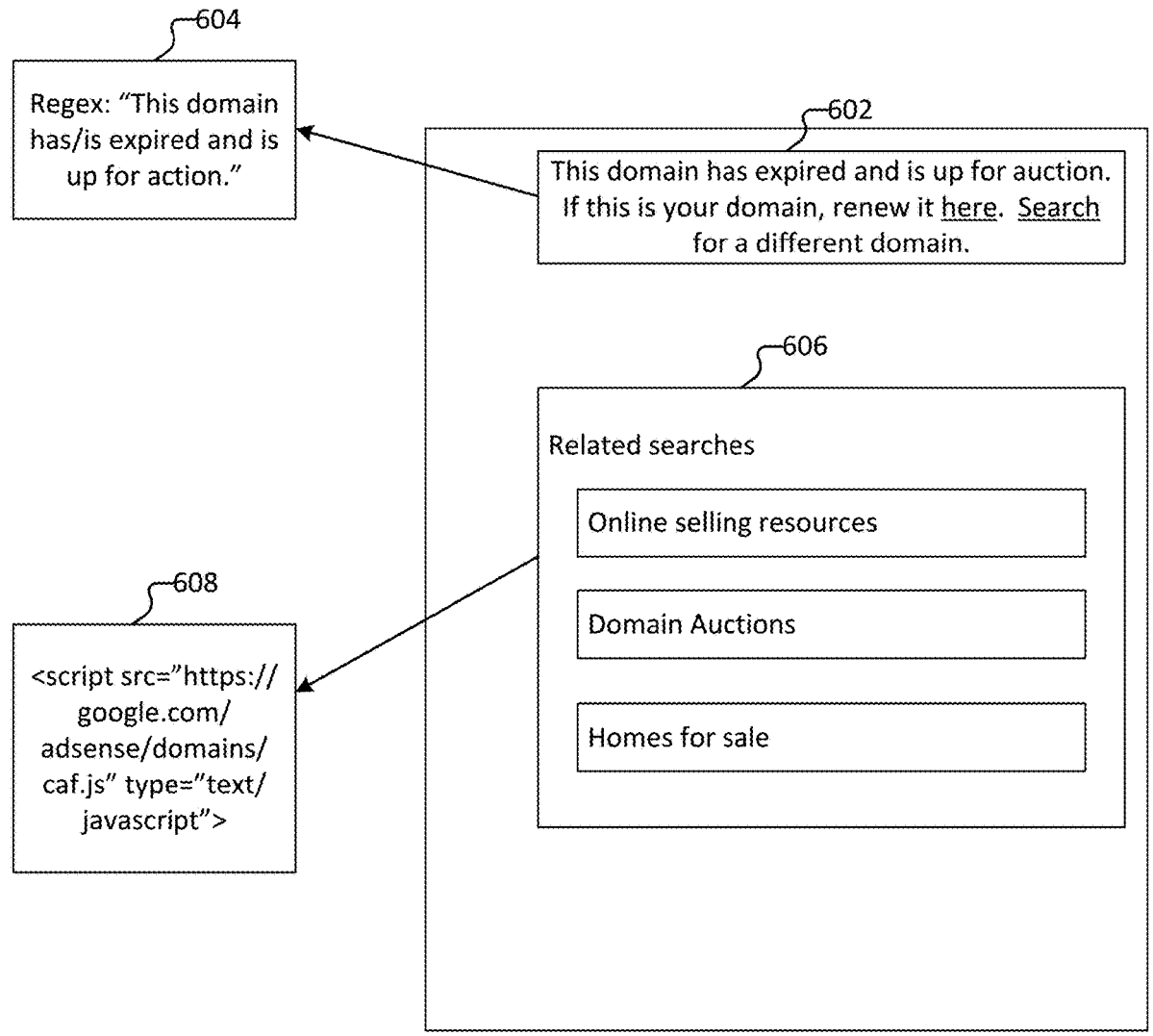
FIG. 6A is an illustration of an example webpage for a parked domain.

FIG. 6A is an illustration of an example webpage for a parked domain. In the example shown, webpage 600 includes element 602 and element 606. The system can identify a regex 604 corresponding to element 602. For example, the system determines the text instance "This domain name has/is expired and is up for action" as a signature of a parked domain. The system can further identify a signature 608 corresponding to element 606. Signature 608 can correspond to a link instance associated with a link included in element 606.

Figure 6B:
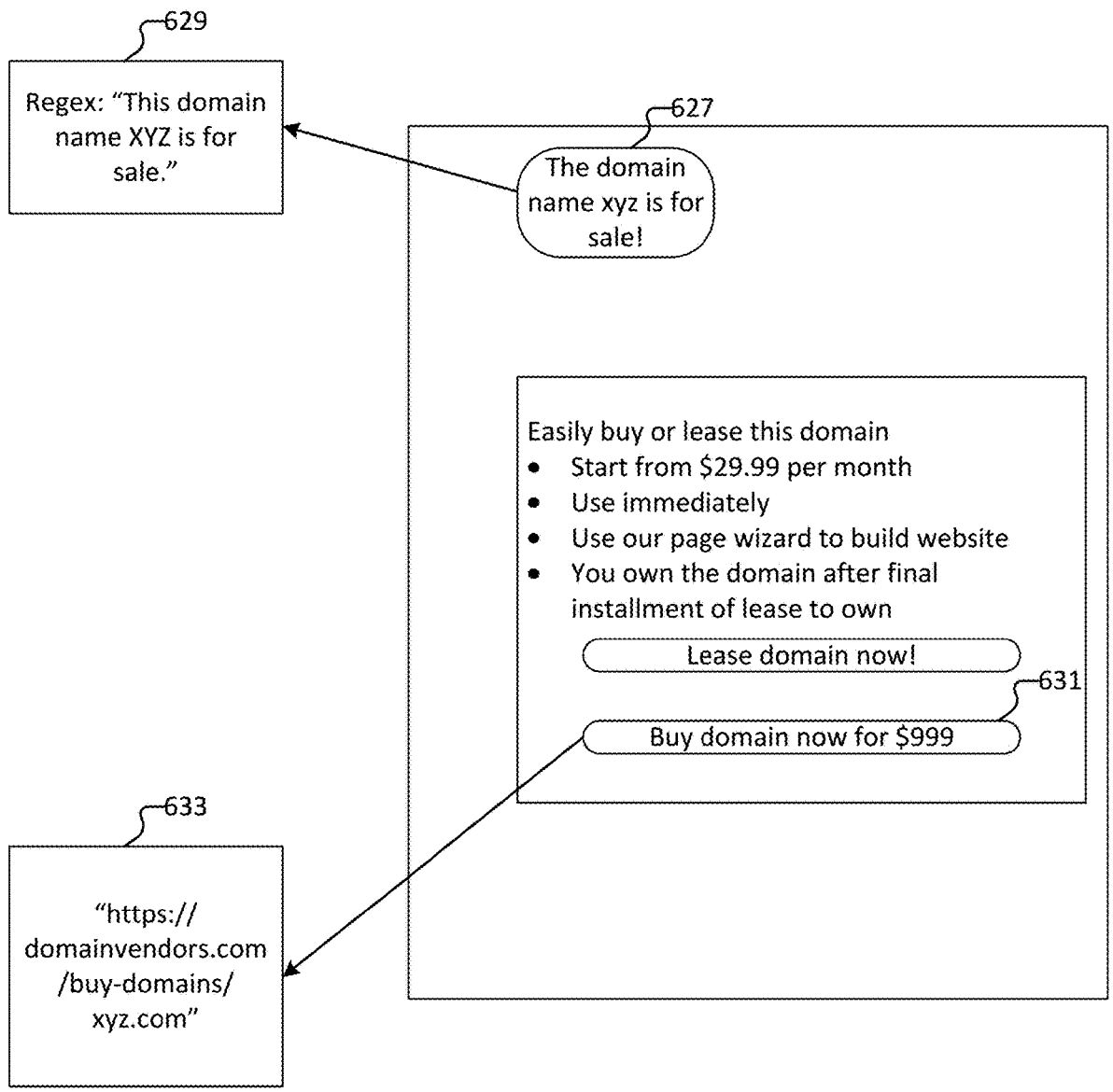
FIG. 6B is an illustration of an example webpage for a parked domain.

FIG. 6B is an illustration of an example webpage for a parked domain. In the example shown, webpage 625 includes element 627 and element 631. The system can identify a regex 629 corresponding to element 627. For example, the system determines the text instance "This domain xyz is for sale" as a signature of a parked domain. The system can further identify a signature 633 corresponding to element 631. Signature 633 can correspond to a link instance associated with a link included in element 631.

Figure 6C:
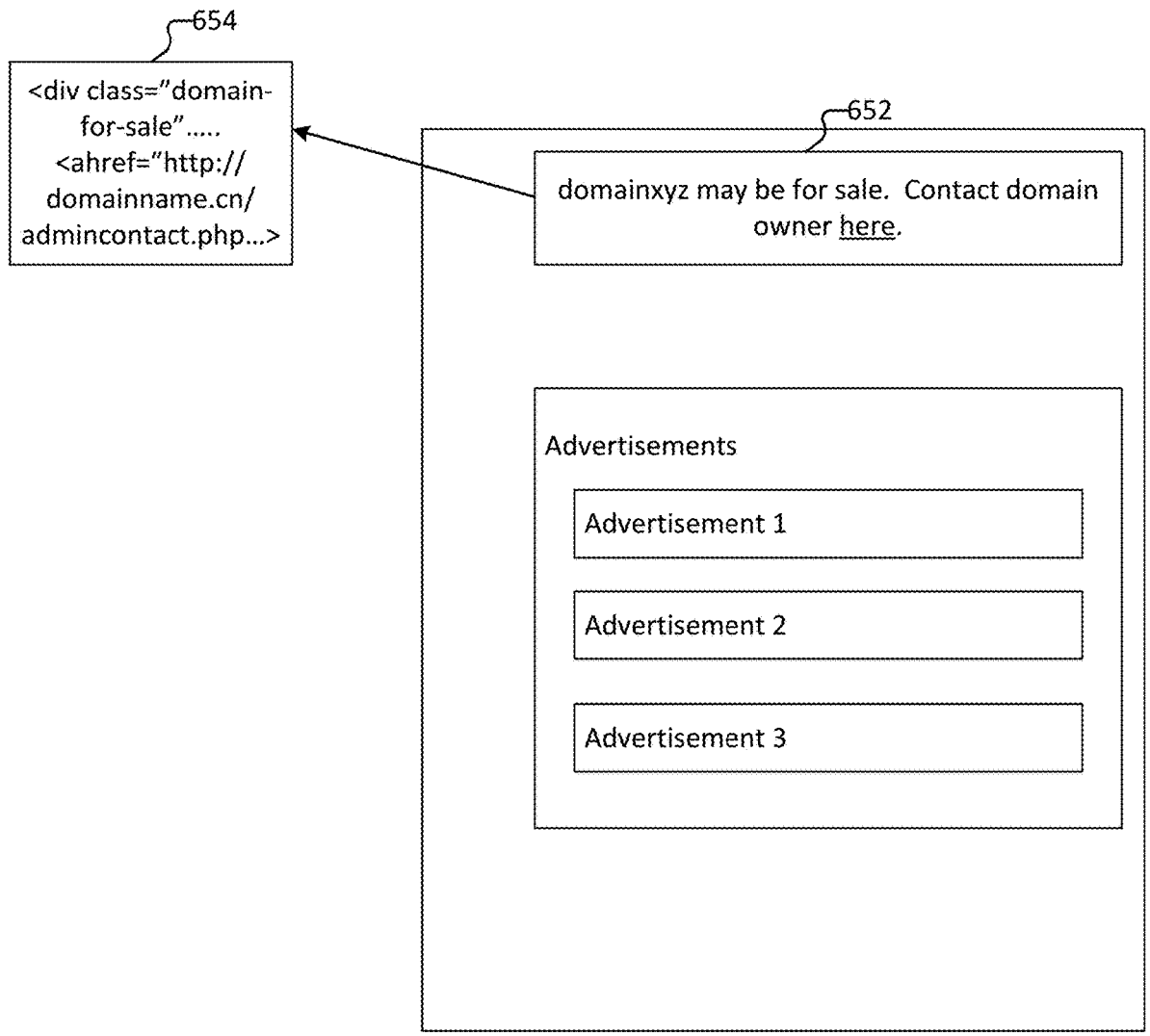
FIG. 6C is an illustration of an example webpage for a parked domain.

FIG. 6C is an illustration of an example webpage for a parked domain. In the example shown, webpage 650 includes element 652. The system can identify a signature 654 corresponding to element 652.

Figure 7:
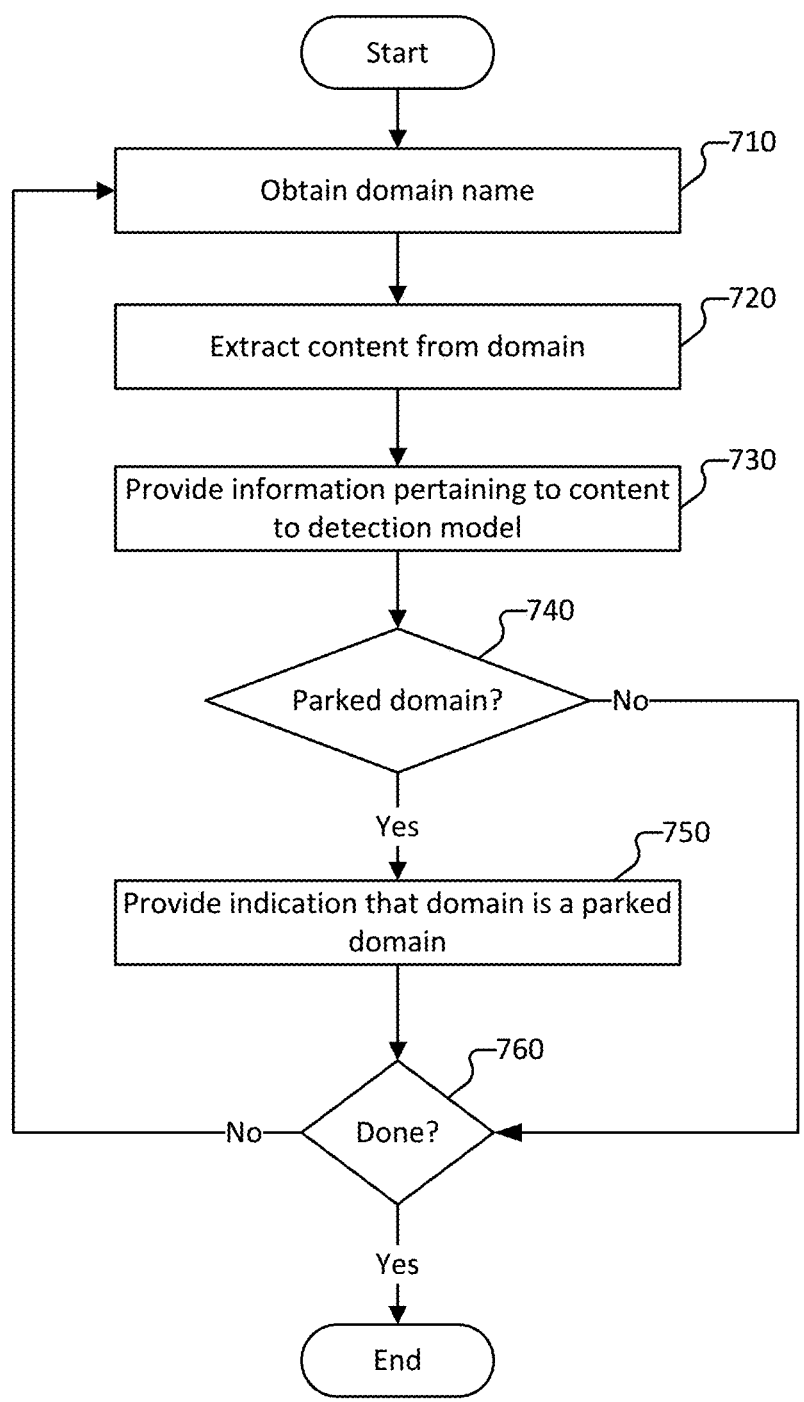
FIG. 7 is a flow diagram of a method for determining whether a domain is a parked domain according to various embodiments.

FIG. 7 is a flow diagram of a method for determining whether a domain is a parked domain according to various embodiments. In some embodiments, process 700 is implemented at least in part by system 100 of FIG. 1 and/or system 200 of FIG. 2. Process 700 may be implemented by an endpoint or security entity, such as in connection with enforcing one or more security policies. Process 700 may be implemented by one or more servers such as servers that provide a cloud service to a security entity or a client system.

At 710, a domain name is received. In some embodiments, the system receives the domain name in connection with a domain request (e.g., a domain access request). The system can receive the domain name from a security entity, such as a firewall, in connection with the security monitoring network traffic. The system may receive the sample domain name in response to a determination that the domain name (e.g., a hash or other signature or identifier associated with the domain/domain name) is not included on a blacklist or whitelist of domain names previously assessed for determination of whether the domain is a parked domain.

At 720, content from the domain is extracted. In some embodiments, the system obtains webpage content for the domain and parses the webpage content to extract certain content from the domain. The content extracted from the domain can correspond to features used to train a model/classifier for detecting parked domains. For example, the system extracts text information included in the webpage content and link information included in the webpage content.

At 730, information pertaining to the content is provided to a detection model. In some embodiments, in response to extracting the content from the webpage for the domain, the system determines one or more HTML/HAR features, and one or more signature count features based at least in part on the content. The system can determine a combined feature vector based at least in part on the content.

At 740, a determination of whether the domain is a parked domain is performed. In some embodiments, the system determines whether the domain is a parked domain based on an analysis of the one or more HTML/HAR features and one or more signature count features (or a combined feature vector of such features) using the machine learning model (e.g., the detection model).

The detection model may provide an indication (e.g., a prediction) of whether the domain is a parked domain, or a likelihood of whether the domain is a parked domain. In response to receiving a likelihood of whether the domain is a parked domain, the system can determine whether the domain is a parked domain based at least in part on one or more thresholds. For example, if the likelihood that the domain is a parked domain exceeds a first predefined likelihood threshold, the system deems the domain to be a parked domain. As another example, if the likelihood that the domain is a parked domain is below one or more of the first predefined likelihood threshold and a second predefined likelihood threshold, the system deems the domain to be an unparked domain (e.g., a benign domain). In some implementations, the system deems the domain to be a parked domain if the likelihood that the domain is a parked domain is below the first predefined likelihood threshold. In some implementations, the system deems the domain to be an unparked domain if the likelihood that the domain is a parked domain is below the second predefined likelihood threshold, wherein the second predefined likelihood threshold is lower than the first predefined likelihood threshold.

In some implementations, if the likelihood that the domain is a parked domain is between the first predefined likelihood threshold and the second predefined likelihood threshold, the system deems that the analysis of the domain is indeterminate. For example, the system forwards the domain name or webpage content for the domain (or information corresponding to the domain) to another system or another classifier. As an example, in the case that analysis of the domain is indeterminate using an XGBoost model, the system analyzes the sample using a neural network model and/or an IPS analysis.

The predefined likelihood threshold(s) can be configured to adjust the sensitivity of the classifier.

In response to determining that the domain is a parked domain at 740, process 700 proceeds to 750 at which a result of whether the domain is a parked domain is provided. In some embodiments, the system provides an indication that the domain corresponds to a parked domain to, for example, an endpoint, security entity, or other system that provided the domain/domain name or requested that the system assess the domain to determine whether the domain is a parked domain. For example, the system updates a blacklist or other mapping of domains to parked domains to include the domain (e.g., a unique identifier associated with the domain such as a hash, a signature, etc.).

In response to determining that the domain is not a parked domain at 740, process 700 proceeds to 760. In some embodiments, in response to determining that the domain is not a parked domain at 740, the system provides an indication that the domain is an unparked domain (e.g., a benign domain) to, for example, an endpoint, security entity, or other system that provided the domain/domain name.

At 760, a determination is made as to whether process 700 is complete. In some embodiments, process 700 is determined to be complete in response to a determination that no further domains are to be analyzed (e.g., no further predictions of whether a domain is a parked domain are to be performed), an administrator indicates that process 700 is to be paused or stopped, etc. In response to a determination that process 700 is complete, process 700 ends. In response to a determination that process 700 is not complete, process 700 returns to 710.

Figure 8:
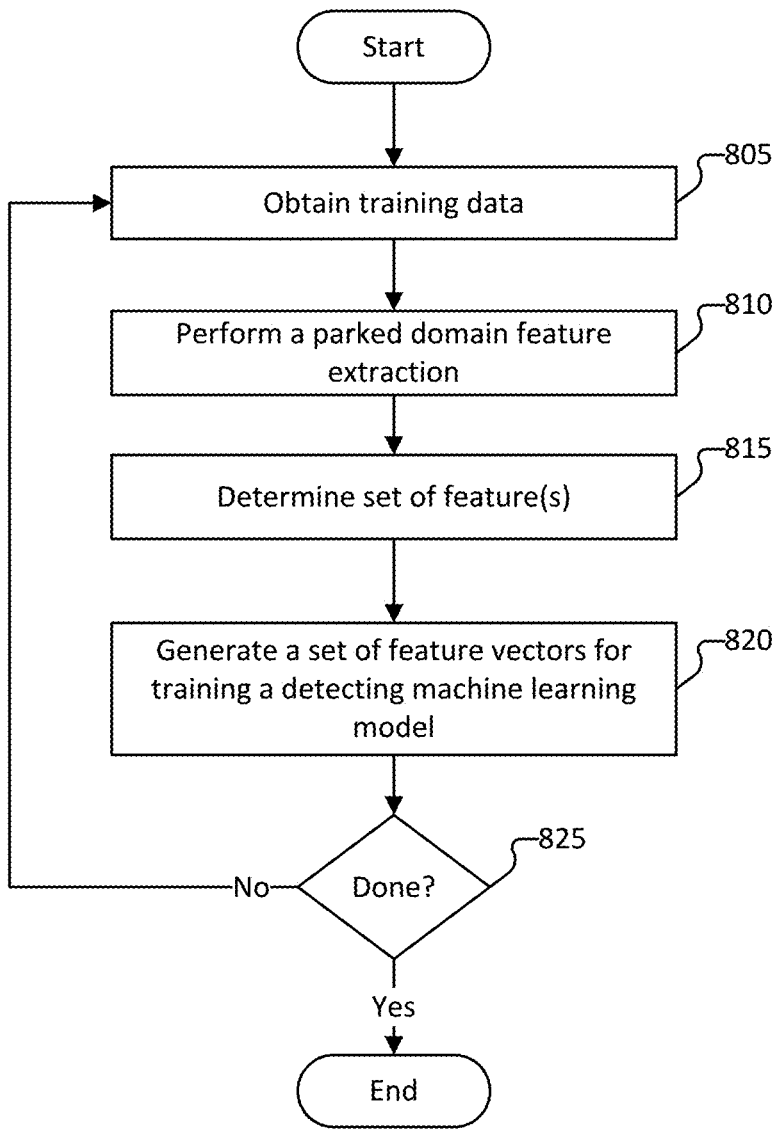
FIG. 8 is a flow diagram of a method for determining a model for detecting parked domains according to various embodiments.

FIG. 8 is a flow diagram of a method for determining a model for detecting parked domains according to various embodiments. In some embodiments, process 800 is implemented at least in part by system 100 of FIG. 1 and/or system 200 of FIG. 2. Process 800 may be implemented by a security entity or one or more servers such as servers that provide a cloud service to a security entity or a client system.

At 805, training data is obtained. In some embodiments, the training data is used in connection with determining the features (e.g., to perform malicious feature extraction or parked domain feature extraction) and/or for training a model to detect parked domains.

At 810, a parked domain feature extraction is performed. In some embodiments, the system performs a parked domain feature extraction in connection with generating (e.g., training) a model to detect parked domains. The malicious feature extraction can include one or more of (i) using predefined regex statements to obtain specific features from webpage content for the training data (e.g., link instances, text instances, etc.), and (ii) using an algorithmic-based feature extraction to filter out described features from a set of raw input data.

In some embodiments, predefined regex statements can be set by an administrator or other user of the system. For example, the predefined regex statements are manually defined and stored at the system (e.g., stored at a security policy or within a policy for training the model). As an example, at least a subset of the regex statements can be expert-defined. The regex statements can be statements that capture certain contextual patterns. For example, malicious structured statements are usually part of a code language. According to various embodiments, feature extraction using regex statements identifies specific syntax included in a sample (e.g., a command or SQL injection string). In some embodiments, the system automatically determines a set of regex statements or other signatures such as by performing a filtering of non-relevant instances using an entropy score, etc.

At 815, a set of features is determined. In some embodiments, the system determines the one or more HTML or HAR features and one or more signature count features to train a pre-filter model. The set of features can be determined based on a result of the parked domain extraction. For example, the system determines the set of features used to build a classifier (e.g., to train a model using a machine learning process). The system can select features between two threshold values with respect to the percentage of exploits in which the features respectively are manifested (e.g., a maximum percentage threshold and a minimum percentage threshold).

At 820, a set of feature vectors is generated for training a machine learning model. In some embodiments, the set of feature vectors used to train the model is obtained based at least in part on training data. As an example, the training data used to determine the set of feature vectors includes sample exploit traffic (e.g., domains that are deemed to be parked domains) and sample benign traffic (domains that are deemed to be unparked domains). The machine learning model is trained to detect parked domains.

At 825, a determination is made as to whether process 800 is complete. In some embodiments, process 800 is determined to be complete in response to a determination that no further domains are to be analyzed (e.g., no further predictions of whether a domain is a parked domain are to be performed), an administrator indicates that process 800 is to be paused or stopped, etc. In response to a determination that process 800 is complete, process 800 ends. In response to a determination that process 800 is not complete, process 800 returns to 805.

Figure 9:
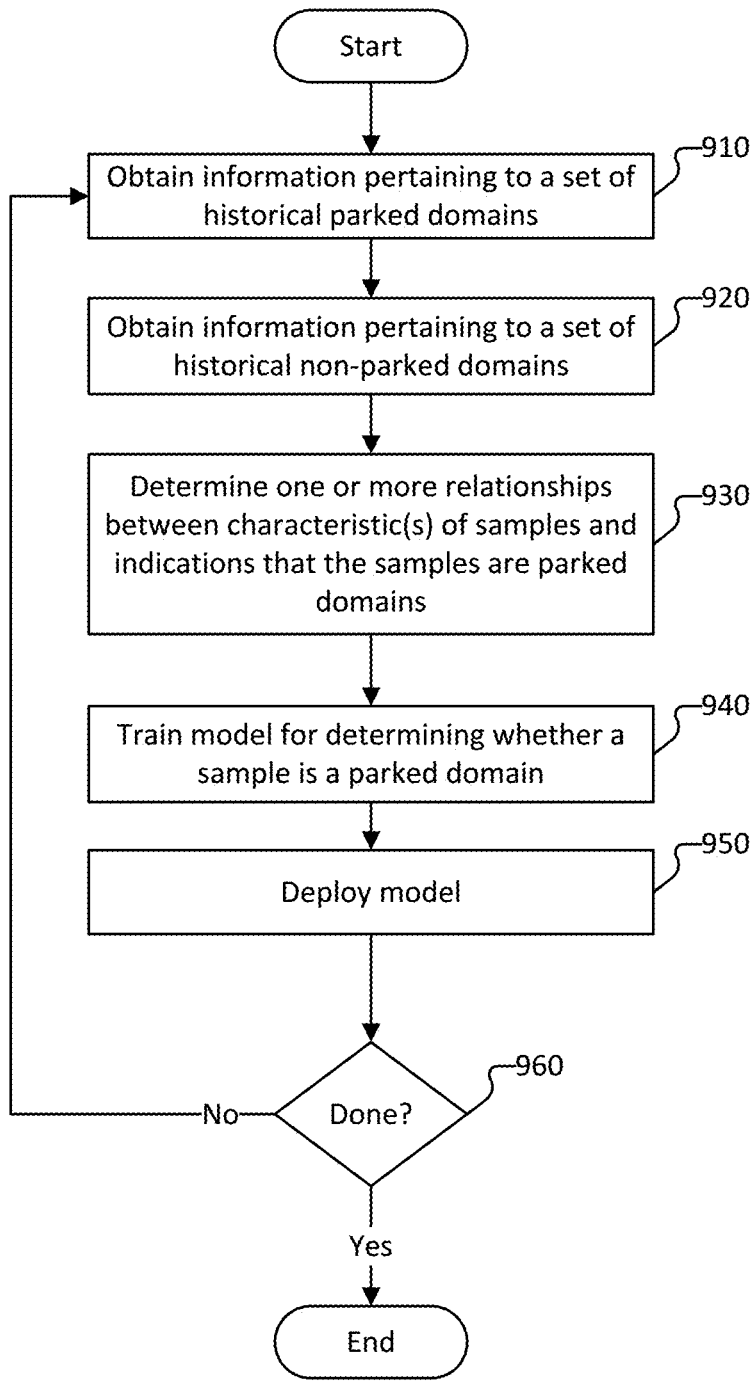
FIG. 9 is a flow diagram of a method for obtaining a model to classify parked domains according to various embodiments.

FIG. 9 is a flow diagram of a method for obtaining a model to classify parked domains according to various embodiments. In some embodiments, process 900 is implemented at least in part by system 100 of FIG. 1 and/or system 200 of FIG. 2. Process 900 may be implemented by a security entity or one or more servers such as servers that provide a cloud service to a security entity or a client system.

At 910, information pertaining to a set of historical parked domains is obtained. For example, the system obtains historical information for domains deemed to be parked domains. In some embodiments, the system obtains the information pertaining to a set of historical parked domains from a third-party service (e.g., VirusTotal™).

At 920, information pertaining to a set of historical benign domains is obtained. For example, the system obtains historical information for domains deemed to be unparked domains. In some embodiments, the system obtains the information pertaining to a set of historical unparked domains from a third-party service (e.g., VirusTotal™).

At 930, one or more relationships between characteristics of samples and maliciousness of samples are determined. In some embodiments, the system determines features pertaining to whether a domain is a parked domain or a likelihood that a domain is a parked domain. The features can be determined based on a parked domain feature extraction process performed with respect to sample exploit traffic. In some embodiments, the features can be determined with respect to a set of regex statements (e.g., predefined regex statements, automatically determined regex statements or signatures) and/or with respect to use of an algorithmic-based feature extraction (e.g., TF-IDF, etc.).

At 940, a model is trained for determining whether a domain is a parked domain. In some embodiments, the model is a machine learning model that is trained using a machine learning process. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DB-SCAN) clustering, principal component analysis, etc. In some embodiments, the model is trained using an XGBoost machine learning classifier model. Inputs to the classifier (e.g., the XGBoost machine learning classifier model) are a combined feature vector or set of feature vectors and based on the combined feature vector or set of feature vectors, the classifier model determines whether the corresponding domain is a parked domain, or a likelihood that the domain is a parked domain.

At 950, the model is deployed. In some embodiments, the deploying the model includes storing the model in a dataset of models for use in connection with analyzing samples to determine whether the domain is a parked domain. In some embodiments, the deploying the model includes storing the model in a dataset of models for use in connection with analyzing domains (or content for webpages of the domains) to determine whether the domain is a parked domain. The deploying the model can include providing the model (or a location at which the model can be invoked) to a parked domain detector, such as parked domain detector 170 of system 100 of FIG. 1, or to system 200 of FIG. 2. In some embodiments, the model is provided to a security entity such as a firewall, etc. for an in-line detection of whether domain requests are directed to domains corresponding to parked domains.

At 960, a determination is made as to whether process 900 is complete. In some embodiments, process 900 is determined to be complete in response to a determination that no further models are to be determined/trained (e.g., no further classification models are to be created), an administrator indicates that process 900 is to be paused or stopped, etc. In response to a determination that process 900 is complete, process 900 ends. In response to a determination that process 900 is not complete, process 900 returns to 910.

Figure 10:
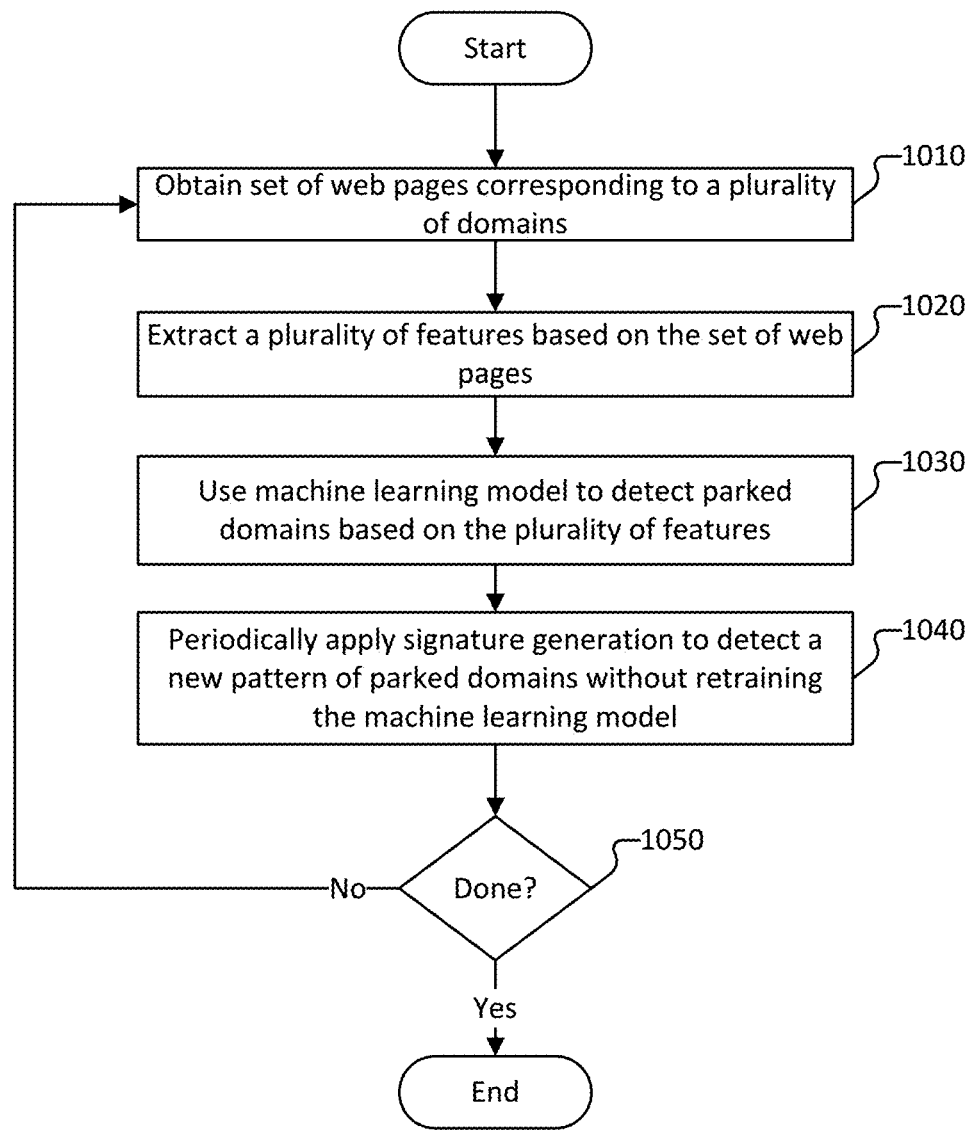
FIG. 10 is a flow diagram of a method for detecting a parked domain according to various embodiments.

FIG. 10 is a flow diagram of a method for detecting a parked domain according to various embodiments. In some embodiments, process 1000 is implemented at least in part by system 100 of FIG. 1, system 200 of FIG. 2. In some embodiments, process 1000 is implemented by an endpoint or security entity, such as in connection with enforcing one or more security policies. Process 1000 may be implemented by one or more servers such as servers that provide a cloud service to a security entity or a client system.

At 1010, a set of webpages corresponding to a plurality of domains is obtained.

At 1020, a plurality of features is extracted based on the set of webpages.

At 1030, a machine learning model is used to detect parked domains based at least in part on the plurality of features.

At 1040, a signature generation is periodically applied to detect a new pattern(s) of parked domains without retraining the machine learning model. In some embodiments, the system automatically updates the signatures (e.g., patterns, signatures, or other regexes) associated with parked domains. The system can perform the analysis of updated webpage content or content for new domains a predetermined time interval since a last determination/update of the signatures. In some embodiments, the model is used to detect subsequent parked domains without a retraining of the model after an update to the signatures.

At 1050, a determination is made as to whether process 1000 is complete. In some embodiments, process 1000 is determined to be complete in response to a determination that no further domains are to be analyzed (e.g., no further detection of parked domains from domains subject to access requests are to be performed), an administrator indicates that process 1000 is to be paused or stopped, etc. In response to a determination that process 1000 is complete, process 1000 ends. In response to a determination that process 1000 is not complete, process 1000 returns to 1010.

Figure 11:
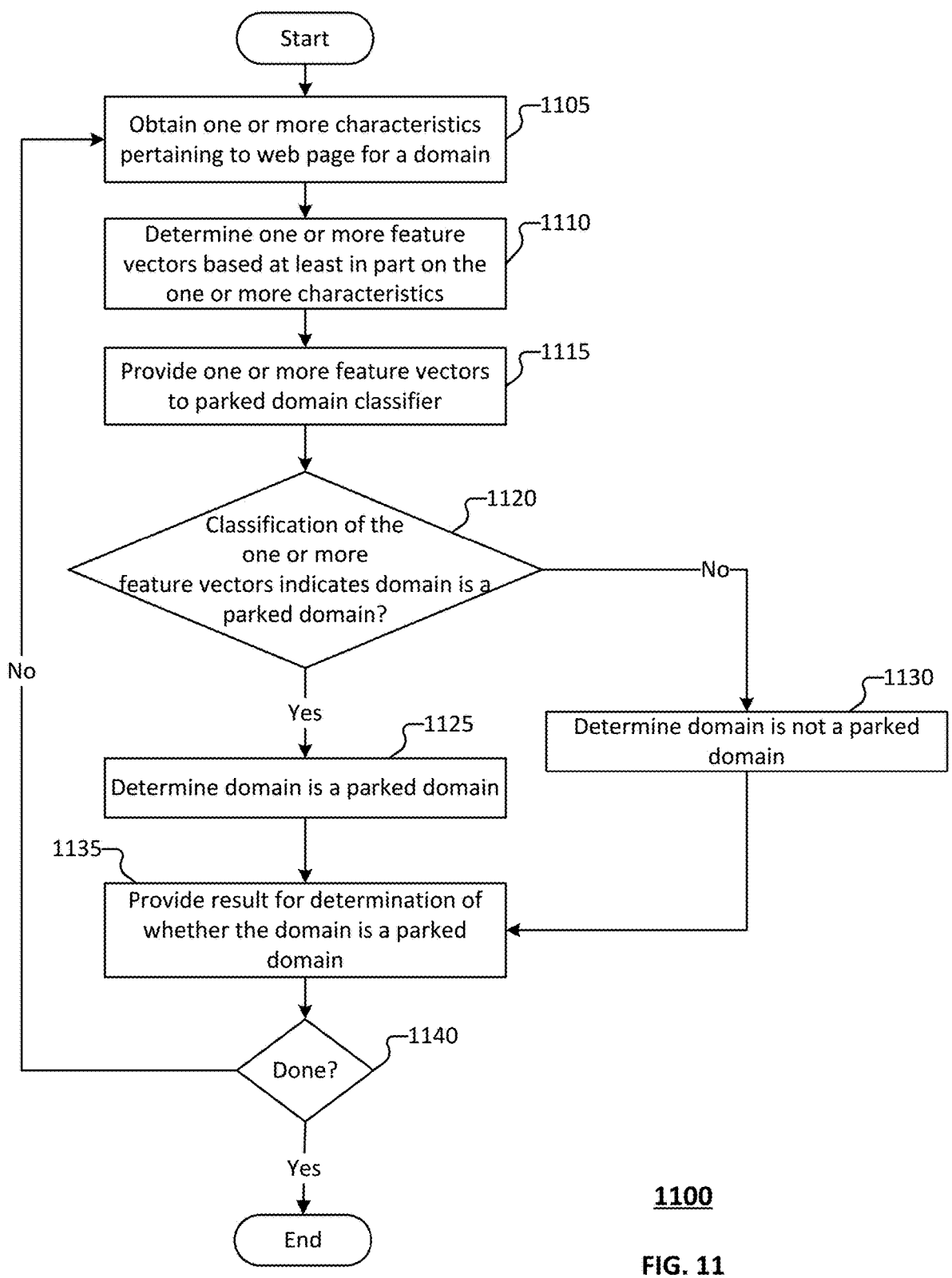
FIG. 11 is a flow diagram of a method for determining whether a domain is a parked domain according to various embodiments.

FIG. 11 is a flow diagram of a method for determining whether a domain is a parked domain according to various embodiments. In some embodiments, process 1100 is implemented at least in part by system 100 of FIG. 1 and/or system 200 of FIG. 2. Process 1100 may be implemented by an endpoint or security entity, such as in connection with enforcing one or more security policies. Process 1100 may be implemented by one or more servers such as servers that provide a cloud service to a security entity or a client system.

At 1105, one or more characteristics pertaining to a webpage for a domain are obtained. The obtaining the one or more characteristics pertaining to the webpage can include obtaining content for a webpage corresponding to the domain, such as by parsing the webpage to extract the content. In some embodiments, the system extracts information pertaining to links or text included in the webpage. Examples of content extracted from the webpage may include strings, images, URLs.

At 1110, one or more feature vectors are determined based at least in part on the one or more characteristics pertaining to the webpage for the domain. In some embodiments, the one or more feature vectors include a set of HTML or HAR features, and a set of signature features.

At 1115, the one or more feature vectors are provided to a parked domain classifier. In some embodiments, the classifier is a machine learning classifier that is trained using a machine learning process. For example, the classifier corresponds to an XGBoost machine learning classifier model. The system uses a model, such as a machine learning model trained by a machine learning process, in connection with determining whether the domain is a parked domain or a likelihood that the domain is a parked domain (or otherwise malicious). For example, the system uses the XGBoost machine learning classifier model to analyze the one or more feature vectors (e.g., the combined feature vector) to determine whether the domain is a parked domain.

At 1120, a determination is performed as to whether classification of the one or more feature vectors indicates that the domain is a parked domain. In some embodiments, if a result of analyzing the feature vector(s) (e.g., the combined feature vector) using the classifier is less than a predefined threshold (e.g., a predefined maliciousness threshold), the system deems (e.g., determines) that the domain is not a parked domain (e.g., the domain is benign). For example, if the result from analyzing the feature vector(s) indicates a likelihood of whether the domain is a parked domain, then the predefined threshold can correspond to a likelihood threshold. As another example, if the result from analyzing the feature vector(s) indicates a degree of similarity of the sample to a malicious sample, then the predefined threshold can correspond to a threshold likelihood. In some embodiments, if a result of analyzing the feature vector(s) (e.g., the combined feature vector) using the classifier is greater than (or greater than or equal to) a predefined threshold, the system deems (e.g., determines) that the domain is a parked domain (e.g., the domain is malicious).

In response to a determination that the classification of the one or more feature vectors indicates that the domain is a parked domain at 1120, process 1100 proceeds to 1125 at which the domain is determined to be malicious.

In response to a determination that the classification of the one or more feature vectors indicates that the domain is not a parked domain at 1120, process 1100 proceeds to 1130 at which the domain is determined to be not malicious. In some embodiments, the system determines that the domain is benign in response to a determination that the classifier indicates that the domain is not a parked domain, or that a likelihood that the domain is a parked domain is less than a predefined maliciousness threshold.

At 1135, a result of whether the domain is a parked domain is provided. In some embodiments, the system provides an indication of whether the domain is a parked domain. The system may provide an update to a blacklist or other mapping of domains to parked domains (or domains to malicious domains) to include the domain (e.g., a unique identifier associated with the domain such as a URL, a hash, a signature, etc.). The system may further provide the corresponding updated blacklist or other mapping to an endpoint, a security entity, etc. For example, the system pushes an update to the blacklist or other mapping of domains to parked domains to other devices that enforce one or more security policies with respect to traffic or files, or that are subscribed to a service of the system.

At 1140, a determination is made as to whether process 1100 is complete. In some embodiments, process 1100 is determined to be complete in response to a determination that no further domains are to be analyzed (e.g., no further detection of parked domains from domains subject to access requests are to be performed), an administrator indicates that process 1100 is to be paused or stopped, etc. In response to a determination that process 1100 is complete, process 1100 ends. In response to a determination that process 1100 is not complete, process 1100 returns to 1105.

Figure 12:
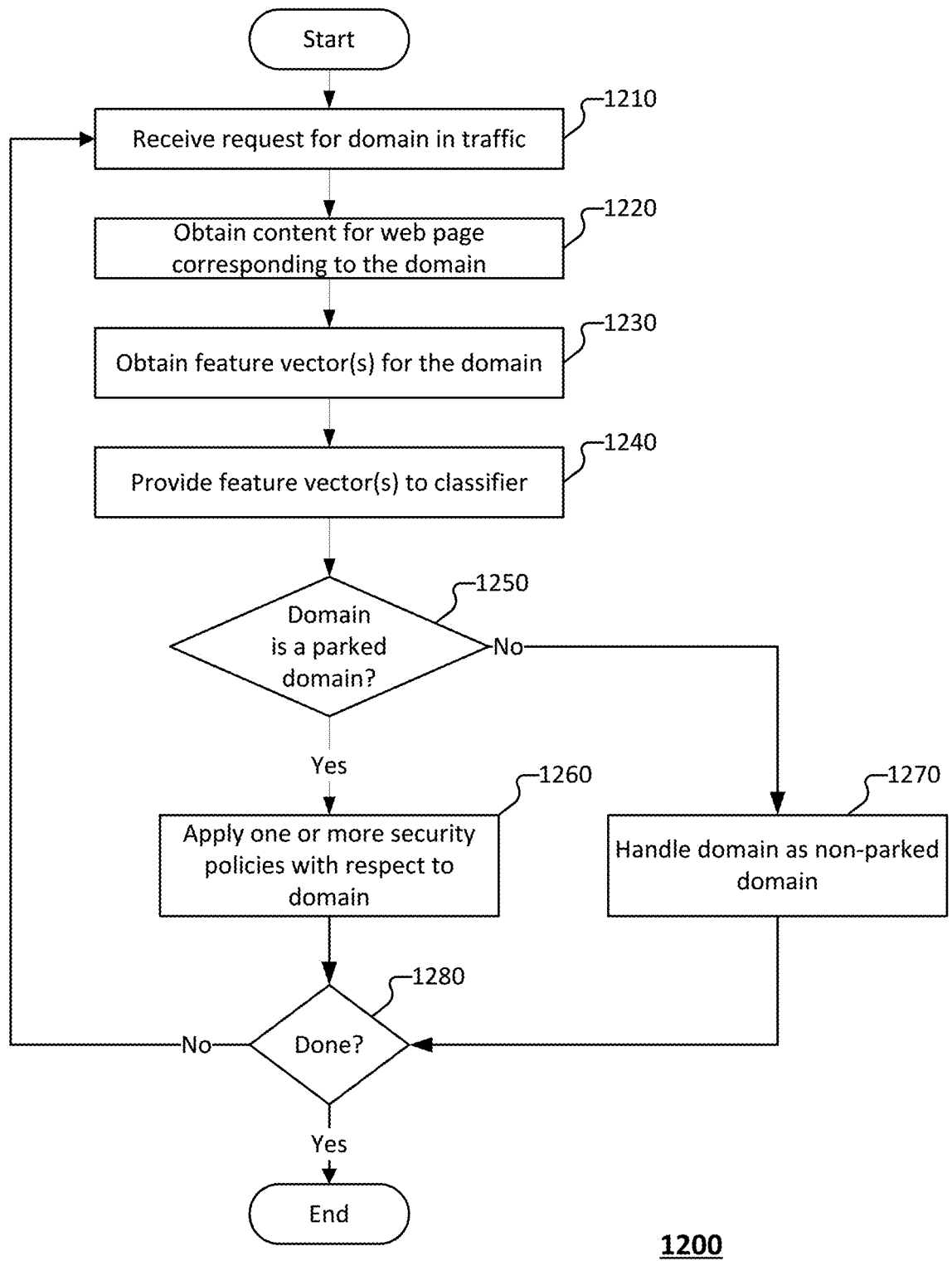
FIG. 12 is a flow diagram of a method for determining whether a domain is a parked domain according to various embodiments.

FIG. 12 is a flow diagram of a method for determining whether a domain is a parked domain according to various embodiments. In some embodiments, process 1200 is implemented at least in part by system 100 of FIG. 1 and/or system 200 of FIG. 2. Process 1200 may be implemented by an endpoint or security entity, such as in connection with enforcing one or more security policies. Process 1200 may be implemented by one or more servers such as servers that provide a cloud service to a security entity or a client system.

At 1210, a request for a domain is received. The system may obtain a request to access the domain from traffic such as in connection with routing traffic within/across a network, or mediating traffic into/out of a network such as a firewall, etc. The system may obtain a request for analysis of the domain from a security entity in response to the security entity receiving a request to access the domain.

At 1220, a content for a webpage corresponding to the domain is obtained. The system may extract the content from the webpage corresponding to the domain. In some embodiments, the system extracts information pertaining to links or text included in the webpage. Examples of content extracted from the webpage may include strings, images, URLs, etc.

At 1230, one or more feature vectors for the domain are obtained. In some embodiments, the one or more feature vectors include a set of HTML, or HAR features, and a set of signature features. The system can provide the one or more feature vectors associated with the domain to a detector that determines whether the domain is a parked domain or whether the domain is otherwise malicious (e.g., provides a prediction of whether the domain is malicious). The one or more feature vectors are determined based on the content for the webpage corresponding to the domain.

At 1240, the one or more feature vectors are provided to a classifier. In some embodiments, the system performs a dynamic analysis of the domain. For example, the system queries the classifier based on the one or more feature vectors. The classifier can be a model such as a machine learning model determined based on implementing a machine learning process. For example, the classifier is an XGBoost model.

At 1250, a determination of whether the domain is a parked domain is performed. In some embodiments, the classifier provides a prediction of whether the domain is a parked domain based on an analysis of the one or more feature vectors.

The model may provide an indication (e.g., a prediction) of whether the domain is a parked domain, or a likelihood of whether the domain is a parked domain. In response to receiving a likelihood of whether the domain is a parked domain, the system can determine whether the domain is a parked domain based at least in part on one or more thresholds. For example, if the likelihood that the domain is a parked domain exceeds a first predefined likelihood threshold, the system deems the domain as a parked domain or otherwise malicious. As another example, if the likelihood that the domain is a parked domain is below one or more of the first predefined likelihood threshold and a second predefined likelihood threshold, the system deems the domain to be non-malicious (e.g., benign). In some implementations, the system deems the domain to be non-malicious if the likelihood that the domain is a parked domain is below the first predefined likelihood threshold. In some implementations, the system deems the domain to be non-malicious if the likelihood that the domain is a parked domain is below the second predefined likelihood threshold, wherein the second predefined likelihood threshold is lower than the first predefined likelihood threshold.

In some implementations, if the likelihood that the sample is malicious is between the first predefined likelihood threshold and the second predefined likelihood threshold, the system deems that the analysis of the sample is indeterminate. For example, the system forwards the sample (or information corresponding to the sample) to another system or another classifier. As an example, in the case that analysis of the sample is indeterminate using an XGBoost model, the system analyzes the sample using a neural network model and/or an IPS analysis.

The predefined likelihood threshold(s) can be configured to adjust the sensitivity of the classifier.

In response to a determination that the domain is a parked domain at 1250, process 1200 proceeds to 1260 at which the domain is handled as a parked domain (e.g., a malicious domain). The system may handle the parked domain based at least in part on one or more policies such as one or more security policies.

According to various embodiments, the handling of the parked domain may include performing an active measure. The active measure may be performed in accordance with (e.g., based at least in part on) one or more security policies. As an example, the one or more security policies may be preset by a network administrator, a customer (e.g., an organization/company) to a service that provides detection of parked domains or otherwise malicious input strings, files, domains, etc. Examples of active measures that may be performed include: isolating the parked domain (e.g., quarantining the request to access the parked domain), alerting the user (or customer of the service) that a parked domain (or malicious domain) was detected, providing a prompt to a user when a device attempts to access the parked domain, blocking transmission of a request to access the parked domain, updating a blacklist of malicious domains (e.g., a mapping of a hash for the webpage of the parked domain to an indication that the domain is a parked domain or otherwise malicious), etc.

In response to a determination that the domain does not correspond to a parked domain at 1250, process 1200 proceeds to 1270 at which the domain is handled as a non-parked domain (e.g., a legitimate or otherwise non-malicious domain).

At 1280, a determination is made as to whether process 1200 is complete. In some embodiments, process 1200 is determined to be complete in response to a determination that no further domains are to be analyzed (e.g., no further detection of parked domains from domains subject to access requests are to be performed), an administrator indicates that process 1200 is to be paused or stopped, etc. In response to a determination that process 1200 is complete, process 1200 ends. In response to a determination that process 1200 is not complete, process 1200 returns to 1210.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
      obtain a set of webpages corresponding to a plurality of domains;
      extract a plurality of features based on the set of webpages, wherein the plurality of features comprise a set of HTML features, a set of one or more HAR features, and a set of signature count features;
      detect parked domains based on the plurality of features using a machine learning model; and
      periodically apply automatic signature generation to detect a new pattern of parked domains without retraining the machine learning model, wherein applying the automatic signature generation comprises obtaining one or more new signatures for the new pattern, extracting one or more new signature count features based on the one or more new signatures, and adding the one or more new signature count features to the set of signature count features; and
   a memory coupled to the one or more processors and configured to provide the one or more processors with instructions.

2. The system of claim 1, wherein a parked domain corresponds to a domain that is registered but that is not connected to an online service.

3. The system of claim 1, wherein the one or more processors are further configured to perform an automatic pattern discovery on the set of webpages in connection with determining a pattern or trend of parked domains.

4. The system of claim 3, wherein performing the automatic pattern discovery includes parsing one or more links or one or more text elements on a corresponding webpage.

5. The system of claim 4, wherein in response to parsing the one or more links or the one or more text elements, the one or more processors determine statistical information pertaining to instances of a plurality of categories of links or text elements.

6. The system of claim 4, wherein:
   the one or more processors are further configured to obtain HTML content associated with the set of webpages; and
   the parsing one or more links comprises extracting links and resources from the HTML content.

7. The system of claim 4, wherein:
   the one or more processors are further configured to obtain HTML content associated with the set of webpages; and
   the parsing one or more text elements comprises text from elements provided in the HTML content.

8. The system of claim 5, wherein the one or more processors are further configured to:
   determine scaled entropies for each category of the plurality of categories based at least in part on the statistical information for the plurality of categories; and
   filter the scaled entropies corresponding to the plurality of categories to obtain a filtered set of instances of links or text for at least a subset of the plurality of categories.

9. The system of claim 8, wherein the one or more processors are further configured to:

generate signatures based at least in part on the filtered set of instances of links or text for the at least subset of the plurality of categories.

10. The system of claim 9, wherein the machine learning model detects a parked domain based at least in part on the signatures.

11. The system of claim 10, wherein the plurality of features comprises one or more signature count features, and the signatures generated based at least in part on the filtered set of instances of links or text for the at least subset of the plurality of categories are used in connection with detecting the parked domain.

12. The system of claim 1, wherein the machine learning model is an XGBoost model.

13. The system of claim 1, wherein the machine learning model determines whether a domain corresponds to a parked domain based at least in part on using (i) the set of HTML and the set of one or more HAR features, and (ii) the set of signature count features.

14. The system of claim 13, wherein the set of HTML features, the set of one or more HAR features, and the set of signature count features are used to generate one or more concatenated features, and a determination of whether a domain is a parked domain is performed based on the one or more concatenated features.

15. The system of claim 1, wherein the one or more processors are further configured to:
in response to determining that a domain corresponds to a parked domain, provide an indication that the domain is a parked domain.

16. The system of claim 1, wherein determining a domain is a parked domain is performed at a security entity.

17. The system of claim 1, wherein determining a domain is a parked domain is performed at a cloud-based security service.

18. The system of claim 1, wherein a new signature is added to the machine learning model without retraining the machine learning model.

19. The system of claim 1, wherein the one or more processors determine whether a domain is a parked domain in response to receiving, from a security entity, a request to analyze the domain.

20. The system of claim 1, the machine learning model uses the one or more new signatures to detect parked domains among subsequently collected sampled domains based at least in part on the use of the set of signature count features.

21. A method, comprising:
obtaining, by one or more processors, a set of webpages corresponding to a plurality of domains;
extracting a plurality of features based on the set of webpages, wherein the plurality of features comprise a set of HTML features, a set of one or more HAR features, and a set of signature count features;
detecting parked domains based on the plurality of features using a machine learning model; and
periodically applying automatic signature generation to detect a new pattern of parked domains without retraining the machine learning model, wherein applying the automatic signature generation comprises obtaining one or more new signatures for the new pattern, extracting one or more new signature count features based on the one or more new signatures, and adding the one or more new signature count features to the set of signature count features.

22. A computer program product embodied in a non-transitory computer readable medium and comprising computer instructions for:
obtaining, by one or more processors, a set of webpages corresponding to a plurality of domains;
extracting a plurality of features based on the set of webpages, wherein the plurality of features comprise a set of HTML features, a set of one or more HAR features, and a set of signature count features;
detecting parked domains based on the plurality of features using a machine learning model; and
periodically applying automatic signature generation to detect a new pattern of parked domains without retraining the machine learning model, wherein applying the automatic signature generation comprises obtaining one or more new signatures for the new pattern, extracting one or more new signature count features based on the one or more new signatures, and adding the one or more new signature count features to the set of signature count features.

23. A system, comprising:
one or more processors configured to:
determine that a determination of whether a domain is a parked domain is to be performed;
extract content from the domain;
apply a machine learning model for detecting whether the domain is a parked domain, wherein
the machine learning model is based at least in part on (i) a set of HTML and HAR features, and (ii) a set of signature count features; and
in response to determining that the domain is a parked domain, cause a request for the domain to be handled in accordance with a policy for handling parked domain requests; and
a memory coupled to the one or more processors and configured to provide the one or more processors with instructions.

* * * * *